US012680588B2

(12) United States Patent (10) Patent No.: US 12,680,588 B2
Manuszak et al. (45) Date of Patent: Jul. 14, 2026

(54) COIL SPRINGS, POCKETED COIL SPRINGS ASSEMBLIES, AND MATTRESSES INCLUDING THE SAME

(71) Applicant: Sealy Technology LLC, Trinity, NC (US)

(72) Inventors: Brian Manuszak, Thomasville, NC (US); Kevin Tar, Summerfield, NC (US)

(73) Assignee: SEALY TECHNOLOGY LLC, Trinity, NC (US)

( * ) Notice: Subject to any disclaimer, the term of this patent is extended or adjusted under 35 U.S.C. 154(b) by 0 days.

(21) Appl. No.: 18/867,566

(22) PCT Filed: Aug. 2, 2024

(86) PCT No.: PCT/US2024/040784
§ 371 (c)(1),
(2) Date: Nov. 20, 2024

(87) PCT Pub. No.: WO2025/030133
PCT Pub. Date: Feb. 6, 2025

(65) Prior Publication Data
US 2025/0172183 A1 May 29, 2025

Related U.S. Application Data

(60) Provisional application No. 63/530,429, filed on Aug. 2, 2023.

(51) Int. Cl.
*F16F 1/04* (2006.01)
*A47C 27/06* (2006.01)
*F16F 1/02* (2006.01)

(52) U.S. Cl.
CPC ............ *F16F 1/047* (2013.01); *A47C 27/064* (2013.01); *A47C 27/068* (2013.01); *F16F 1/024* (2013.01);
(Continued)

(58) Field of Classification Search
CPC ...... F16F 1/047; F16F 1/024; F16F 2228/066; F16F 2230/105; F16F 2238/026;
(Continued)

(56) References Cited

U.S. PATENT DOCUMENTS 1,963,053 A * 6/1934 Powers .............. A47C 23/0438
                                                267/272
3,076,203 A * 2/1963 Verreau ................ A47C 27/065
                                                5/256
(Continued)

OTHER PUBLICATIONS

United States Patent and Trademark Office, International Search Report and Written Opinion issued in corresponding Application No. PCT/US2024/040784 mailed Nov. 15, 2024.

*Primary Examiner* — Matthew Troutman
*Assistant Examiner* — Alison N Labarge
(74) *Attorney, Agent, or Firm* — Stites & Harbison, PLLC; Terry L. Wright; James R. Hayne

(57) ABSTRACT
A coil spring comprises a continuous wire forming a lowermost convolution, an uppermost convolution, and a plurality of helical intermediate convolutions. The coil spring is divided into an upper portion and a lower portion. The intermediate convolutions of the lower portion have a diameter greater than or equal to a lower minimum diameter, and the pitch between each of the convolutions of the lower portion is greater than or equal to a lower minimum pitch. The intermediate convolutions of the upper portion have a diameter greater than or equal to an upper minimum diameter, and the pitch between each of the convolutions of the upper portion is less than or equal to an upper maximum pitch. The upper minimum diameter is greater than, less than, or equal to the lower minimum diameter, and the upper maximum pitch is less than the lower minimum pitch to provide a non-linear and variable response.

17 Claims, 11 Drawing Sheets

(52) U.S. Cl.
CPC ... *F16F 2228/066* (2013.01); *F16F 2230/105* (2013.01); *F16F 2238/026* (2013.01)

(58) Field of Classification Search
CPC ... A47C 27/064; A47C 27/068; A47C 27/065; A47C 27/063
See application file for complete search history.

(56) References Cited

U.S. PATENT DOCUMENTS

| | | | |
|---|---|---|---|
| 6,085,397 A | 7/2000 | Workman et al. | |
| 6,098,968 A | 8/2000 | Workman | |
| 6,149,143 A | 11/2000 | Richmond et al. | |
| 6,159,319 A | 12/2000 | Mossbeck | |
| 6,173,464 B1 | 1/2001 | McCune et al. | |
| 6,202,238 B1 | 3/2001 | Mossbeck et al. | |
| 6,256,820 B1 | 7/2001 | Moser et al. | |
| 6,260,223 B1 | 7/2001 | Mossbeck et al. | |
| 6,272,706 B1 | 8/2001 | McCune et al. | |
| 6,295,673 B1 | 10/2001 | Mossbeck | |
| 6,318,416 B1 | 11/2001 | Grueninger | |
| 6,353,952 B1 | 3/2002 | Wells | |
| 6,375,169 B1 * | 4/2002 | McCraw | A47C 27/065 |
| | | | 267/75 |
| 6,408,514 B1 | 6/2002 | Mossbeck et al. | |
| 6,490,744 B1 | 12/2002 | Schulz, Jr. | |
| 6,574,811 B1 | 6/2003 | Mossbeck | |
| 6,681,428 B2 | 1/2004 | Wells | |
| 6,684,435 B1 | 2/2004 | Wells | |
| 6,813,791 B2 | 11/2004 | Mossbeck et al. | |
| 6,829,798 B2 | 12/2004 | Wells | |
| 6,862,763 B2 | 3/2005 | Mossbeck et al. | |
| D531,436 S | 11/2006 | Eigenmann et al. | |
| 7,386,897 B2 | 6/2008 | Eigenmann et al. | |
| D574,168 S | 8/2008 | Eigenmann et al. | |
| D575,564 S | 8/2008 | Eigenmann et al. | |
| D621,186 S | 8/2010 | DeMoss | |
| 7,908,693 B2 | 3/2011 | DeMoss | |
| D651,828 S | 1/2012 | DeMoss et al. | |
| D652,234 S | 1/2012 | DeMoss et al. | |
| D652,235 S | 1/2012 | DeMoss et al. | |
| 8,266,745 B2 | 9/2012 | Mossbeck | |
| 8,474,078 B2 | 7/2013 | Mossbeck | |
| 8,484,784 B2 | 7/2013 | Mossbeck | |
| 8,720,872 B2 | 5/2014 | DeMoss et al. | |
| 8,857,799 B2 | 10/2014 | Tyree | |
| 8,978,183 B1 | 3/2015 | Richmond et al. | |
| 9,022,369 B2 | 5/2015 | Demoss et al. | |
| 9,044,102 B2 | 6/2015 | Haffner et al. | |
| 9,138,801 B2 | 9/2015 | Eigenmann et al. | |
| 9,352,913 B2 | 5/2016 | Manuszak et al. | |
| 9,370,252 B2 | 6/2016 | Eigenmann et al. | |
| 9,380,883 B1 | 7/2016 | Mosssbeck | |
| 9,392,876 B2 | 7/2016 | Tyree | |
| 9,414,692 B2 | 8/2016 | Mossbeck et al. | |
| 9,427,090 B2 | 8/2016 | Mossbeck et al. | |
| 9,861,206 B2 | 1/2018 | Corodemus | |
| 9,936,815 B2 | 4/2018 | DeMoss et al. | |
| 10,010,189 B2 | 7/2018 | Eigenmann et al. | |
| 10,010,190 B2 | 7/2018 | Eigenmann et al. | |
| 10,034,553 B2 | 7/2018 | Long | |
| D825,974 S | 8/2018 | Eigenmann et al. | |
| 10,076,193 B2 | 9/2018 | Long | |
| 10,165,867 B2 | 1/2019 | Mossbeck | |
| 10,172,472 B2 | 1/2019 | Long | |
| 10,206,515 B1 | 2/2019 | Jewett et al. | |
| 10,334,958 B2 | 7/2019 | Wyler | |
| 10,477,979 B2 | 11/2019 | Jewett et al. | |
| 10,598,242 B2 | 3/2020 | Thomas et al. | |
| 10,610,029 B2 | 4/2020 | DeMoss et al. | |
| 10,935,098 B2 | 3/2021 | Thomas et al. | |
| 11,026,517 B2 | 6/2021 | DeMoss et al. | |
| 11,033,114 B2 | 6/2021 | DeMoss et al. | |
| 11,076,705 B2 | 8/2021 | Thomas et al. | |
| 11,317,730 B2 | 5/2022 | Jewett et al. | |
| 11,375,825 B2 | 7/2022 | Ghanei et al. | |
| 11,480,228 B2 | 10/2022 | DeMoss et al. | |
| 11,608,869 B1 | 3/2023 | DeMoss et al. | |
| 12,127,679 B2 | 10/2024 | DeMoss et al. | |
| 12,135,066 B2 | 11/2024 | DeMoss et al. | |
| D1,064,696 S * | 3/2025 | Cavallo | D6/718.31 |
| 12,385,542 B2 | 8/2025 | DeMoss et al. | |
| 12,398,774 B2 | 8/2025 | DeMoss et al. | |
| 12,398,775 B2 | 8/2025 | DeMoss et al. | |
| 2006/0042016 A1 * | 3/2006 | Barman | A47C 27/064 |
| | | | 5/256 |
| 2007/0022532 A1 * | 2/2007 | Ahn | A47C 27/04 |
| | | | 5/430 |
| 2007/0101507 A1 * | 5/2007 | Grothaus | A47C 27/065 |
| | | | 5/655.8 |
| 2008/0017271 A1 * | 1/2008 | Haltiner | B21F 33/04 |
| | | | 198/418 |
| 2012/0112396 A1 * | 5/2012 | DeFranks | F16F 1/04 |
| | | | 267/180 |
| 2013/0192003 A1 * | 8/2013 | Demoss | A47C 27/07 |
| | | | 5/716 |
| 2014/0250602 A1 * | 9/2014 | Spinks | A47C 23/0438 |
| | | | 267/180 |
| 2015/0084250 A1 * | 3/2015 | Ahn | F16F 1/06 |
| | | | 267/142 |
| 2016/0029809 A1 * | 2/2016 | Shive | A47C 27/05 |
| | | | 5/718 |
| 2017/0335914 A1 * | 11/2017 | Thomas | A47C 27/064 |
| 2025/0172183 A1 | 5/2025 | Tar et al. | |

* cited by examiner

500

504     505     504     505

600

606      607      606      607

COIL SPRINGS, POCKETED COIL SPRINGS ASSEMBLIES, AND MATTRESSES INCLUDING THE SAME

RELATED APPLICATIONS

This application claims priority from U.S. Provisional Application Ser. No. 63/530,429, filed Aug. 2, 2023, the entire disclosure of which is incorporated herein by this reference.

TECHNICAL FIELD

The present invention relates to coil springs, pocketed coil spring assemblies, and mattresses including the same. In particular, the present invention relates to pocketed coil spring assemblies that include a coil spring that exhibits a non-linear and variable response.

BACKGROUND

Typically, when a uniaxial load is applied to a spring, the spring exhibits a linear compression rate. That is to say, it takes twice as much force to compress a typical spring two inches as it does to compress the same spring one inch. The linear response of springs is expressed by Hooke's law which states that the force (F) needed to extend or compress a spring by some distance (D) is proportional to that distance. This relationship is expressed mathematically as $F=kD$, where k represents the spring constant for a particular spring. A high spring constant indicates that the spring requires more force to compress, and a low spring constant means the spring requires less force to compress.

Linear response springs, such as certain wire coil springs, are commonly used as mattress innersprings in combination with padding and upholstery that surround the innersprings. Most mattress innersprings are comprised of an array of wire coil springs which are often adjoined by lacing end convolutions of the coil springs together with cross wires. An advantage of this arrangement is that it is inexpensive to manufacture. However, this type of innerspring often provides a firm and rigid mattress surface.

An alternative to an innerspring mattress is a mattress constructed of one or more foam layers. Unlike an innerspring mattress comprised of an array of wire coil springs, foam mattresses exhibit a non-linear response to forces applied to the mattress. In particular, a foam mattress provides more support as the load increases. For instance, a typical foam mattress provides increased support after it has been compressed approximately 60% of the maximum compression of the foam. The non-linear response of foam mattresses provides improved sleep comfort for a user. However, the mechanical properties of certain foam may degrade over time affecting the overall comfort of the foam mattress. Furthermore, foam mattresses are often more costly to produce than metal spring mattresses. Accordingly, an improved coil spring design that provides non-linear and variable responses would be both highly desirable and beneficial.

SUMMARY

The present invention meets some or all of the above-identified needs, as will become evident to those of ordinary skill in the art after a study of information provided in this document.

This summary describes several embodiments of the present invention, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this summary or not. To avoid excessive repetition, this summary does not list or suggest all possible combinations of such features.

The present invention includes coil springs, pocketed coil spring assemblies, and mattresses including the coil springs and associated pocketed coil spring assemblies, where the included coil springs exhibit a non-linear and variable response. In some embodiments, a coil spring is provided that comprises a continuous wire forming a lowermost convolution, an uppermost convolution opposite the lowermost convolution, and a plurality of helical intermediate convolutions between the lowermost convolution and the uppermost convolution. The continuous wire of the coil spring defines a pitch between the lowermost convolution and the helical convolution adjacent to the lowermost convolution, a pitch between each one of the plurality of intermediate convolutions, and a pitch between the uppermost convolution and the intermediate convolution adjacent to the uppermost convolution.

The continuous wire of the exemplary coil spring and, in turn, the coil spring itself, is divided into a lower portion and an upper portion. The lower portion includes the lowermost convolution of the coil spring and one or more of the intermediate convolutions of the coil spring, with each of the one or more intermediate convolutions of the lower portion having a diameter greater than or equal to a lower minimum diameter, and with the pitch between each of the convolutions of the lower portion greater than or equal to a lower minimum pitch. The upper portion of the continuous wire and formed coil spring then includes the uppermost convolution and one or more of the intermediate convolutions, with each of the one or more intermediate convolutions of the upper portion having a diameter greater than or equal to an upper minimum diameter, and with the pitch between each of the convolutions of the upper portion less than or equal to an upper maximum pitch. Moreover, in some embodiments of the exemplary coil springs, the upper minimum diameter is greater than or equal to the lower minimum diameter and the upper maximum pitch is less than the lower minimum pitch, such that the exemplary coil spring exhibits a variable and non-linear response. In other embodiments of the exemplary coil springs, the upper minimum diameter is less than or equal to the lower minimum diameter and the upper maximum pitch is less than the lower minimum pitch, such that the exemplary coil spring still exhibits a variable and non-linear response.

In some embodiments of the exemplary coils springs described herein, the lower portion includes a total of between three convolutions and eight convolutions. In some embodiments, the upper portion includes a total of between three convolutions and six convolutions. In some embodiments, the number of convolutions of the upper portion is less than or the same as a number of convolutions of the lower portion.

With further regard to the diameters of the coils springs of the present invention, in certain embodiments of coil springs, the diameters are configured to provide a particular spring constant and resultant feel and shape to the coil springs. For instance, in certain embodiments, the lower portion of an exemplary spring has an hourglass shape by providing a coil spring where the diameter of the lowermost convolution is greater than the lower minimum diameter, the diameter of the intermediate convolution of the lower portion adjacent to the upper portion is greater than the lower minimum diameter, and at least one of the convolutions of the lower portion has a diameter equal to the lower minimum diameter. In some embodiments, an hourglass shape in the lower portion is provided by having a diameter of a central convolution of the lower portion that is equal to the lower minimum diameter and by having the diameter of each of the other convolutions of the lower portion be greater than the lower minimum diameter. Similarly, in some embodiments, an hourglass shape can also be provided in an upper portion of a spring by providing a spring where the diameter of the intermediate convolution of the upper portion adjacent to the lower portion is greater than the upper minimum diameter, the diameter of another intermediate convolution of the upper portion is greater than the upper minimum diameter, and the diameter of at least one intermediate convolution positioned there between is equal to the upper minimum diameter. In some such embodiments having an hourglass shaped upper portion, the diameter of the uppermost convolution is equal to the upper minimum diameter.

In some embodiments, exemplary coil springs are also provided in alternative configurations to provide a coil spring having alternative spring constants and shapes. For instance, in certain embodiments, a coil spring is provided where the diameters of each of the intermediate convolutions of the upper portion are substantially equal and the diameter of the uppermost convolution is less than the diameters of each of the intermediate convolutions of the upper portion such that the upper portion has a stovepipe shape. As another example, in a further embodiment, a coil spring is provided where the diameters of the convolutions of the intermediate convolutions of the upper portion gradually decrease from the lower portion towards the uppermost convolution such that the upper portion has a conical shape. As another example, in some embodiments, a coil spring is provided where the diameters of the convolutions of the intermediate convolutions of the upper portion gradually increase from the lower portion towards the uppermost convolution such that the upper portion has a funnel shape. As an even further example, in some embodiments, a coil spring is provided where the diameter of the intermediate convolution of the upper portion adjacent to the lower portion and the diameter of the intermediate convolution of the upper portion adjacent to the uppermost convolution is the upper minimum diameter, and the diameter of at least one intermediate convolution positioned there between is greater than the upper minimum diameter such that the upper portion has a barrel shape.

Further included in some embodiments of the present invention are pocketed coil springs that make use of the coils springs described herein. In some embodiments, a pocketed coil spring is provided that comprises a coil spring with a flexible enclosure forming a pocket around the coil spring. The coil spring, in some exemplary pocket coil spring embodiments, includes a continuous wire forming a lowermost convolution, an uppermost convolution opposite the lowermost convolution, and a plurality of helical intermediate convolutions between the lowermost convolution and the uppermost convolution. The continuous wire further defines a pitch between the lowermost convolution and the helical convolution adjacent to the lowermost convolution, a pitch between each one of the plurality of intermediate convolutions, and a pitch between the uppermost convolution and the intermediate convolution adjacent to the uppermost convolution. The continuous wire forming the coil spring included in the pocket coil spring is then divided into a lower portion and an upper portion. The lower portion includes the lowermost convolution and one or more of the intermediate convolutions, with each of the one or more intermediate convolutions of the lower portion having a diameter greater than or equal to a lower minimum diameter, and with the pitch between each of the convolutions of the lower portion greater than or equal to a lower minimum pitch. The upper portion then includes the uppermost convolution and one or more of the intermediate convolutions, with each of the one or more intermediate convolutions of the upper portion having a diameter greater than or equal to an upper minimum diameter, and with the pitch between each of the convolutions of the upper portion less than or equal to an upper maximum pitch. In some embodiments of the exemplary pocket coil springs, the upper minimum diameter is then less than, greater than, or equal to the lower minimum diameter and the upper maximum pitch is less than the lower minimum pitch. The diameter of a central convolution of the lower portion is then equal to the lower minimum diameter and the diameter of each of the other convolutions of the lower portion is the same and is greater than the lower minimum diameter such that the lower portion has an hourglass shape.

Still further provided in some embodiments of the present invention are mattress assemblies including the coil springs and/or pocket coil springs described herein. In some embodiments, a mattress assembly is provided that comprises a plurality of parallel strands of pocketed coil springs, with each strand including a plurality of pocketed coil springs of the present invention aligned along a length of the strand. In some embodiments of the coil springs included in an exemplary mattress assembly, the upper minimum diameter is less than, greater than, or equal to the lower minimum diameter and the upper maximum pitch is less than the lower minimum pitch. In some embodiments, the diameter of a central convolution of the lower portion is equal to the lower minimum diameter and the diameter of each of the other convolutions of the lower portion is the same and is greater than the lower minimum diameter such that the lower portion has an hourglass shape. Further, in some embodiments of the mattress assemblies, for each of the plurality of coil springs, one of the plurality of coil springs is in a first orientation and an adjacent coil spring is in a second orientation rotated 180° about a longitudinal axis of the coil springs relative to the first orientation.

In some embodiments of the mattress assemblies that make use of the coil springs positioned in the above-described first and second orientations, the coil spring in the first orientation and the adjacent coil spring in the second orientation are located in the same strand of pocketed coil springs. In some embodiments, the coil spring in the first orientation and the adjacent coil spring in the second orientation are located in adjacent strands of pocketed coil springs. In some embodiments, each of the plurality of coil springs in the strand of pocketed coil springs including the coil spring in the first orientation are also in the first orientation, while in some embodiments, each of the plurality of coil springs in the strand of pocketed coil springs including the coil spring in the second orientation are also in the second orientation. In some embodiments, another adjacent coil spring located in an adjacent strand of pocketed coil springs is also in the second orientation.

In yet further implementations of the present invention, methods of manufacturing a mattress assembly are additionally provided. In some implementations, a method of manufacturing a mattress assembly is provided that comprises a first step of providing a plurality of coil springs of the present invention. A pocket is then formed around each coil spring with a flexible enclosure such that each pocketed coil spring is in a strand of pocketed coil springs. A plurality of the strands of pocketed coil springs is then positioned in parallel with one another to form the mattress assembly. In some embodiments of the coil springs included in the mattress assembly, the upper minimum diameter is less than, greater than, or equal to the lower minimum diameter and the upper maximum pitch is less than the lower minimum pitch. In certain embodiments, prior to forming the pocket around each coil spring, each coil spring is positioned in either a first orientation or a second orientation rotated 180° about a longitudinal axis of the coil spring relative to the first orientation.

In some implementations of the exemplary methods of manufacturing a mattress assembly described herein, the plurality of coil springs are provided from a coiler and the orientation of the spring is determined by an amount of wire included in the lowermost convolution of the coil spring. In some embodiments, the coil springs that are in the second orientation are provided with an additional half turn of wire in the lowermost convolution of the coil spring such that a terminal end of the coil springs in the first orientation and a terminal end of the coil springs in the second orientation are in substantially the same place relative to the pocket around each coil spring. In other embodiments, the plurality of coil springs are provided from a coiler and the orientation of the spring is determined by a turning mechanism after the coiler provides the spring and before the pocket is formed around the coil spring.

Further features and advantages of the present invention will become evident to those of ordinary skill in the art after a study of the description, figures, and non-limiting examples in this document.

DESCRIPTION OF EXEMPLARY EMBODIMENTS

The present invention includes coil springs, pocketed coil spring assemblies, and mattresses including the same. In particular, the present invention includes pocketed coil spring assemblies that include a coil spring that exhibits a non-linear and variable response.

Figure 1:
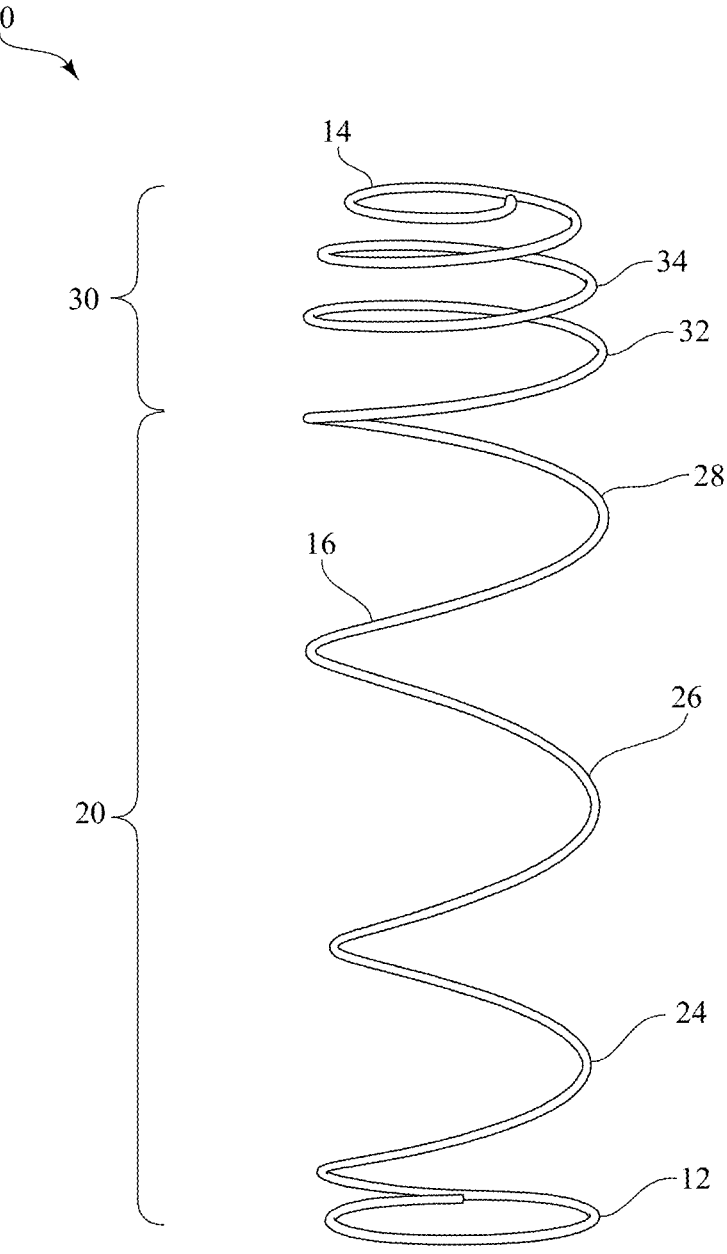
FIG. 1 is perspective view of a coil spring made in accordance with the present invention.

Referring first to FIG. 1, in one exemplary embodiment of the present invention, a coil spring 10 is provided that is comprised of a continuous wire 16 forming a plurality of convolutions of the coil spring 10 that are each made up of a portion of the continuous wire 16 substantially equal to about one turn of the continuous wire 16 (i.e., about 360° of the helical path of the continuous wire 16). In particular, the continuous wire 16 of the coil spring 10 forms a lowermost convolution 12, an uppermost convolution 14 opposite the lowermost convolution, and a plurality of helical intermediate convolutions 24, 26, 28, 32, 34 between the lowermost convolution 12 and the uppermost convolution 14.

The lowermost convolution 12 of the continuous wire 16 forms a substantially closed circular loop at the bottom of the coil spring 10, while the uppermost convolution 14 similarly forms a substantially closed circular loop at the top of the coil spring 10. In this way, the coil spring 10 thus terminates at either end in a generally planar form that serves as the supporting end structures of the coil spring 10, while the intermediate convolutions 24, 26, 28, 32, 34 helically spiral between the lowermost convolution 12 and the uppermost convolution 14. In this way, the lowermost convolution 12 and the uppermost convolution 14 can be characterized as "inactive" convolutions while the intermediate convolutions 24, 26, 28, 32, 34 can be characterized as "active" convolutions.

With further respect to the continuous wire 16, the lowermost convolution 12, the uppermost convolution 14, and the plurality of helical intermediate convolutions 24, 26, 28, 32, 34 are arranged such that the coil spring 10 is generally divided into a lower portion 20 and an upper portion 30. The lower portion 20 of the coil spring 10 includes the lowermost convolution 12 and one or more of the intermediate convolutions, which in this exemplary embodiment includes a first intermediate convolution 24, a second intermediate convolution 26, and a third intermediate convolution 28. The upper portion 30 of the coil spring 10 likewise includes the uppermost convolution 14 and one or more of the intermediate convolutions, which in this exemplary embodiment includes a fourth intermediate convolution 32 and a fifth intermediate convolution 34. As such, the lower portion 20 of the exemplary coil spring 10 includes a total of four convolutions and the upper portion 30 of the exemplary coil spring 10 includes a total of three convolutions. However, the number of convolutions included in a lower portion and an upper portion is not limited and can be modified depending on the intended purpose of the coil spring. For example, in some embodiments, the lower portion can include a total of three convolutions to eight convolutions (i.e., the lowermost convolutions plus an additional two to seven intermediate convolutions). Likewise, in some embodiments, the upper portion can include a total of two convolutions to six convolutions (i.e., the uppermost convolution plus an additional one to five intermediate convolutions). Regardless of the specific number of convolutions, in some embodiments, the number of convolutions of the upper portion is less than the number of convolutions of the lower portion. In other embodiments, however, the number of convolutions may be the same or there may be more convolutions in the upper portion.

As also shown in FIG. 1, by forming the coil spring 10 from a continuous wire 16, the lowermost convolution 12 has a diameter, the uppermost convolution 14 has a diameter, and each of the intermediate convolutions 24, 26, 28, 32, 34 has a respective diameter. The continuous wire 16 further defines a pitch between the lowermost convolution 12 and the first helical convolution 24 adjacent to the lowermost convolution 12, a pitch between each one of the plurality of intermediate convolutions 24, 26, 28, 32, 34, and a pitch between the uppermost convolution 14 and the fifth intermediate convolution 34 adjacent to the uppermost convolution 14.

With respect to the diameter of convolutions and the pitch between the convolutions, in most coil springs formed using helically-spiraling continuous wire, the spring constant and resultant feel of the coil spring are typically determined by a combination of: the gauge of the wire forming the coil spring; the total number of convolutions in the coil spring; the size of the convolutions (diameter); and the pitch or vertical spacing (or pitch angle) between the convolutions. In this regard, the pitch (or vertical spacing) between each convolution of a coil spring is, in some instances, controlled by the rate at which the continuous wire, which forms the coil spring, is drawn through a forming die in a coil-forming machine. In other instances, the pitch and diameter are produced by a coiling machine with specific pitch and diameter tooling that is either cam or servo driven. The means of producing the coil spring is not particularly limited, and, in any event, once formed, a larger pitch will typically produce a stiffer coil spring due to the increased vertical orientation of the wire, while a smaller pitch will typically produce a softer coil spring and allow for a larger number of total convolutions in the coil body. Similarly, larger diameter convolutions in a coil spring also contribute to a lower spring constant and consequentially softer feel than smaller diameter convolutions in coil springs. Of course, because the wire forming the coil spring is continuous, there is generally no defined beginning point or ending point of any single convolution. Furthermore, the diameter and pitch is typically adjusted gradually between one portion of the spring to another. As such, oftentimes a single convolution of a coil spring may not have just one single diameter or just one single pitch, but may include, for example, a beginning or end portion with a variable diameter and/or pitch that transitions to the adjacent convolution. Therefore, as used herein, the diameter and pitch of a convolution will typically refer to an average diameter and pitch, but can also be inclusive of a maximum diameter and pitch or a minimum diameter and pitch.

With further regard to the maximum diameters and pitches and/or the minimum diameters and pitches, and unless otherwise indicated, reference to a minimum diameter or pitch or to a maximum diameter or pitch observed in a convolution of an upper or lower portion of an exemplary coil spring is generally a reference to a minimum diameter or pitch or a maximum diameter or pitch observed in an active convolution of the exemplary coils springs rather than in an inactive convolution. For example, the phrase "lower minimum diameter" and the like is used herein to refer to the smallest diameter observed in an active convolution in an lower portion of an exemplary coil spring. Similarly, the phrase "upper maximum pitch" and the like is used herein to refer to the largest pitch observed between active convolutions in an upper portion of an exemplary coil spring.

In the exemplary coil springs of the present invention described herein, the wire gauge of the coil springs generally has a standard range of about 13 ga. (2.3 mm) to about 18 ga. (1.2 mm). However, other gauges are also possible without departing from the spirit and scope of the present invention. Furthermore, while in some embodiments the wire gauge is substantially consistent along the entire length of the continuous wire, in some other embodiments, the wire gauge may vary.

In those embodiments where the wire gauge is consistent, by varying the diameters, the pitches, or both the diameters and the pitches, a variable and non-linear loading response is provided where a first spring constant provides a softer feel as the spring is initially compressed and a second spring constant provides a firmer feel as the compression of the coil spring increases.

Referring once again to FIG. 1, in the exemplary coil spring 10, each of the active convolutions of the lower portion 20 (i.e., the lower three intermediate convolutions 24, 26, 28) have a diameter greater than or equal to a lower minimum diameter or, in other words, the smallest diameter of the active convolutions included in the lower portion 20. The pitch between each of the convolutions 12, 24, 26, 28 of the lower portion 20 is then greater than or equal to a lower minimum pitch or, in other words, the smallest pitch between the active convolutions in the lower portion 20. Furthermore, each of the active convolutions of the upper portion 30 (i.e., the upper two intermediate convolutions 32, 34) have a diameter less than or equal to an upper maximum diameter (i.e., the greatest diameter of the active convolutions of the upper portion 30), and the pitch between each of the convolutions 32, 34, 14 of the upper portion 30 is less than an upper maximum pitch (i.e., the greatest pitch between the active convolutions in the upper portion 30). In the exemplary coil spring 10, the upper maximum diameter is less than or equal to the lower minimum diameter and the upper maximum pitch is less than the lower minimum pitch. In other words, each of the active convolutions of the upper portion 30 has a diameter that is less than or equal to the diameter of each of the active convolutions of the lower portion 20. Likewise, the pitch between each of the active convolutions of the upper portion 30 is less than or equal to the pitch between each of the active convolutions of the lower portion 20. However, in other embodiments, one or more of the active convolutions of the upper portion may have a diameter larger than the diameter of one or more of the active convolutions of the lower portion. In still other embodiments, the pitch between one or more of the active convolutions of the upper portion may be larger than the pitch between one or more of the active convolutions of the lower portion. In embodiments of the present invention which include inactive convolutions (e.g., the lowermost convolution and/or the uppermost convolution), the diameter of these inactive convolutions and the pitch between these inactive convolutions and the immediate adjacent active convolutions can also vary regardless of the diameter and/or pitch of the active convolutions without departing from the spirit and scope of the present invention.

As shown in FIG. 1, with respect to the lower portion 20 in particular, the diameter of the lowermost convolution 12 is greater than the lower minimum diameter, the diameter of the intermediate convolution 28 of the lower portion 20 adjacent to the upper portion 30 is greater than the lower minimum diameter, and at least one of the other convolutions of the lower portion 20 has a diameter equal to the lower minimum diameter such that the lower portion has an hourglass shape. In particular, the second intermediate convolution 26 has a diameter that is equal to the lower minimum diameter while each of the other convolutions 12, 24, 28 of the lower portion 20 is greater than the lower minimum diameter. In this exemplary embodiment, the diameter of the lowermost convolution 12, the diameter of the first intermediate convolution 24, and the diameter of the third intermediate convolution 28 are all substantially equal. However, the diameters of these three or other convolutions in the lower portion 20 can vary without departing from the spirit and scope of the present invention. In particular, because the lowermost convolution 12 is an inactive convolution, the diameter of the lowermost convolution 12 will not affect the response of the coil spring 10 but is instead chosen based on other considerations, such as ease of construction or stability. In this regard, due to its status as an inactive convolution and as shown in the coil spring 10 of FIG. 1, the terminal end of the lowermost convolution 12 generally has a diameter that transitions from a smaller diameter at the terminal end of the lowermost convolution 12 to a diameter substantially equal to that of the first intermediate convolution 24 and the third intermediate convolution 28, such that, as indicated above, the lowermost convolution 12 is generally considered to have a diameter greater than that of the lower minimum diameter despite the lower convolution seemingly being smaller than the lower minimum diameter adjacent to the very terminal end of the lower convolution 12.

In the exemplary coil spring 10 shown in FIG. 1, where there are three intermediate convolutions 24, 26, 28 included in the lower portion 20, the second intermediate convolution 26 can be characterized as a central convolution. According to some embodiments, regardless of the number of convolutions in the lower portion, a central convolution is provided which has a smaller diameter than the diameter of the remaining coils, such that the lower portion has an hourglass shape. That is to say, while the central convolution in the exemplary coil spring 10 shown in FIG. 1 is the second intermediate convolution 26, in other embodiments where there are more convolutions in the lower portion, the central convolution may be, for example, the third intermediate convolution or the fourth intermediate convolution. In any event, the difference in diameter between the smaller central convolution and the remaining active convolutions is not limited, but can, in some embodiments, range from about 0.1 mm to about 10 mm. By including a smaller central convolution 26, the lower portion 20 of the present invention exhibits a variable spring response, as discussed further below.

Regardless of the specific diameters of the active convolutions of the lower portion, in some embodiments of the present invention, the diameter of each of the active convolutions of the upper portion is greater than or equal to the diameter of the smaller central convolution of the lower portion. Referring still to FIG. 1, with respect to the upper portion 30 in particular, the diameters of the fourth intermediate convolution 32 and the fifth intermediate convolution 34 are substantially equal to each other and also substantially equal to the diameter of the first intermediate convolution 24 and the diameter of the third intermediate convolution 28. However, the diameters of the fourth intermediate convolution 32 and the fifth intermediate convolution 34 are greater than the diameter of the second intermediate convolution 26 (i.e., the lower minimum diameter). As the diameters of the two active convolutions of the upper portion 30 (i.e., the four intermediate convolution 32 and the fifth intermediate convolution 34) are the same, the diameter of these convolutions is the upper minimum diameter. As such, and as previously mentioned, the upper minimum diameter (i.e., the diameter of the uppermost convolution 14) is greater than or equal to the lower minimum diameter (i.e., the diameter of the second intermediate convolution 26). Of note, the uppermost convolution 14 has a diameter that is less than the diameter of the fourth intermediate convolution 32 and the fifth intermediate convolution 34. However, and similar to the lowermost convolution 12, the uppermost convolution 14 is an inactive convolution, and therefore the diameter of the uppermost convolution 14 will not affect the response of the coil spring 10 but is instead chosen based on other considerations, such as ease of construction or stability.

Due to the construction of the lower portion 20 and upper portion 30 described above, it is contemplated that the spring response of the upper portion 30 is different than the spring response of the lower portion 20. More specifically, coil springs made in accordance with the present invention exhibit a variable response that starts off softer and increases in firmness at a non-linear rate. For example, according to some embodiments, an exemplary coil spring has an uncompressed height of about 2.5" (6.35 cm) to about 12" (30.5 cm). During an initial compression of the coil spring (e.g., a first 1" of compression), an exemplary coil spring is about 10%-60% softer than a linear spring. During a second amount of compression (e.g., a second 1" of compression), the exemplary coil spring is about 10%-40% softer than a linear spring. During a third amount of compression (e.g., a third 1" of compression), the exemplary coil spring is about 0%-50% firmer than a linear spring.

Data regarding the compression response of exemplary coil spring made in accordance with the present invention is provided in Table 1 below.

11

TABLE 1

| Preload .95 +/- 0.10 | 1" .40 +/- .04 | 2" .45 +/- .05 | 3" .60 +/- .06 |
|---|---|---|---|
| 0.978 | 0.421 | 0.441 | 0.585 |
| 0.962 | 0.424 | 0.441 | 0.587 |
| 0.924 | 0.421 | 0.442 | 0.579 |
| 0.918 | 0.42 | 0.45 | 0.582 |
| 0.937 | 0.414 | 0.444 | 0.592 |
| 0.994 | 0.424 | 0.478 | 0.596 |
| 0.997 | 0.42 | 0.472 | 0.565 |
| 1.005 | 0.423 | 0.46 | 0.582 |
| 1.022 | 0.425 | 0.462 | 0.583 |
| 0.983 | 0.427 | 0.465 | 0.58 |
| 0.919 | 0.416 | 0.443 | 0.59 |
| 0.945 | 0.425 | 0.486 | 0.605 |
| 0.94 | 0.416 | 0.437 | 0.604 |
| 0.93 | 0.419 | 0.462 | 0.606 |
| 0.958 | 0.421 | 0.461 | 0.588 |
| 0.926 | 0.419 | 0.455 | 0.595 |
| 0.97 | 0.422 | 0.456 | 0.581 |
| 0.908 | 0.42 | 0.454 | 0.595 |
| 0.909 | 0.418 | 0.449 | 0.597 |
| 0.928 | 0.422 | 0.467 | 0.599 |
| 1.058 | 0.418 | 0.475 | 0.6 |
| 1.066 | 0.421 | 0.486 | 0.614 |
| 1.069 | 0.418 | 0.47 | 0.603 |
| 1.056 | 0.417 | 0.461 | 0.597 |
| 1.085 | 0.416 | 0.47 | 0.604 |
| 0.989 | 0.41 | 0.436 | 0.591 |
| 1.011 | 0.413 | 0.435 | 0.565 |
| 1.021 | 0.414 | 0.463 | 0.607 |
| 0.972 | 0.416 | 0.5 | 0.61 |
| 1.07 | 0.414 | 0.428 | 0.586 |
| 0.986 | 0.419 | 0.47 | 0.59 |
| 0.971 | 0.422 | 0.461 | 0.564 |
| 0.995 | 0.421 | 0.479 | 0.585 |
| 0.999 | 0.426 | 0.452 | 0.594 |
| 1.005 | 0.419 | 0.475 | 0.604 |
| 0.973 | 0.426 | 0.483 | 0.593 |
| 0.984 | 0.427 | 0.471 | 0.579 |
| 0.957 | 0.427 | 0.493 | 0.594 |
| 0.967 | 0.42 | 0.482 | 0.588 |
| 0.966 | 0.42 | 0.476 | 0.59 |
| 0.981 | 0.420 | 0.462 | 0.591 |

To provide the coil spring 10 having a spring response where the upper portion 30 is different than the spring response of the lower portion 20, the half turn of the continuous wire between the third intermediate convolution 28 and the fourth intermediate convolution is generally regarded as a transition turn or, in other words, the portion of the coil spring 10 where the coil spring 10 transitions from the softer upper portion 30 to the firmer lower portion 20 of the coil spring 10. In this way, once all of the turns of the upper portion 30 are compressed and deactivated, the firmer lower portion 20 fully activates. As such, in some embodiments and without wishing to be bound by any particular theory or mechanism, it is contemplated that by varying the location, pitch, diameter, and the like of the transition turn, it is possible to further adjust the extent to which the upper and lower portions of an exemplary spring compresses and deactivates and, in turn, when the coil transitions from a soft to firm feel.

In addition to varying the transition turn, the particular shape of the upper portion is also not limited and can be chosen to provide a particular spring constant and resultant feel of the upper portion of the coil spring. As a non-limiting example of possible shapes, and referring now to FIGS. 2A-2E, the upper portion of an exemplary coil spring made in accordance with the present invention can have a stovepipe, or cylindrical, shape (FIG. 2A), an hourglass shape (FIG. 2B), a conical shape (FIG. 2C), a funnel shape (FIG. 2D), or a barrel shape (FIG. 2E).

12

Figures 2A, 2B, 2C, 2D, 2E:
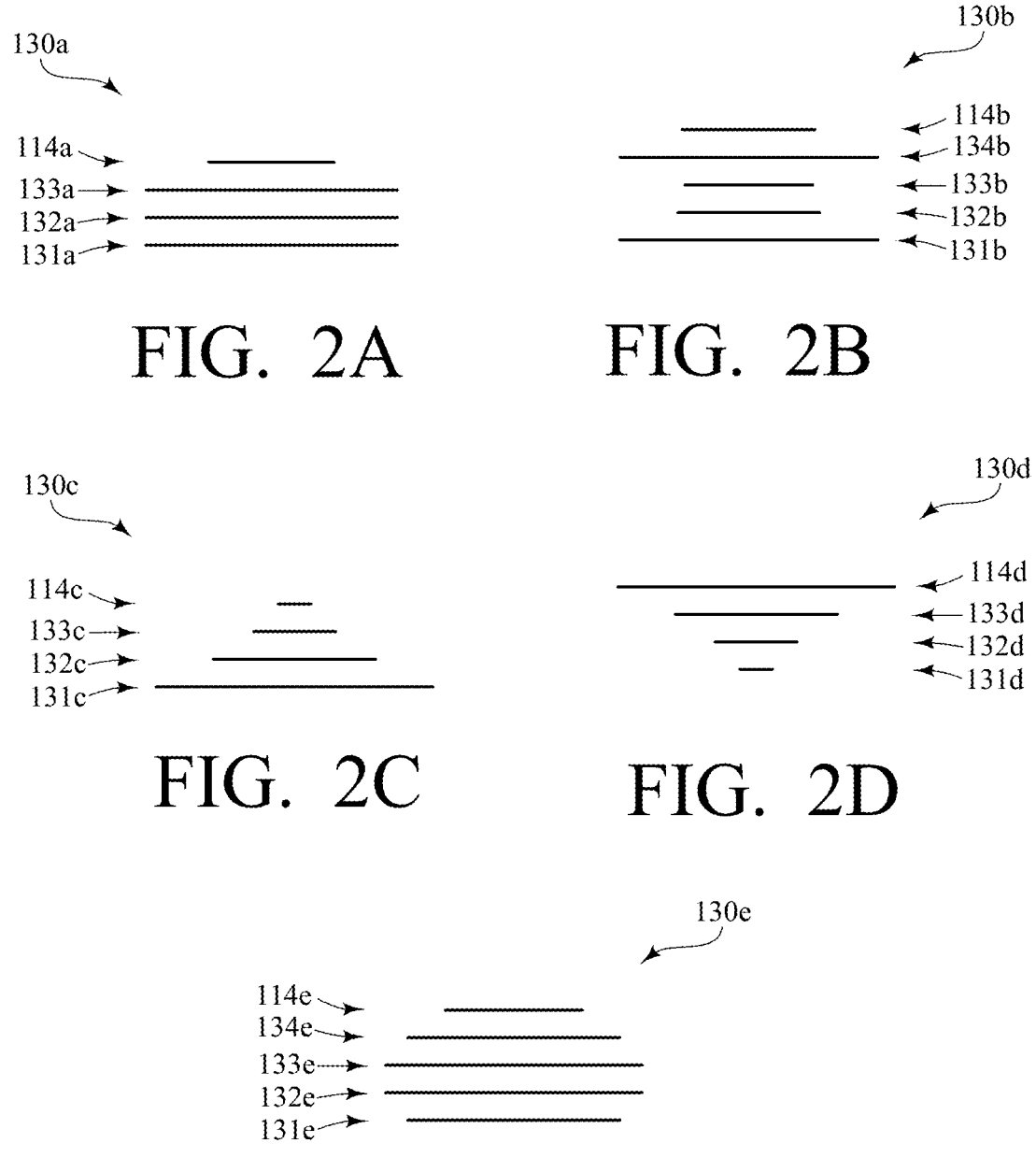
FIG. 2A is a side schematic view of an upper portion of an exemplary coil spring, the upper portion having a stove-pipe shape.
FIG. 2B is a side schematic view of an upper portion of an exemplary coil spring, the upper portion having an hourglass shape.
FIG. 2C is a side schematic view of an upper portion of an exemplary coil spring, the upper portion having a conical shape.
FIG. 2D is a side schematic view of an upper portion of an exemplary coil spring, the upper portion having a funnel shape.
FIG. 2E is a side schematic view of an upper portion of an exemplary coil spring, the upper portion having a barrel shape.

Referring now to FIG. 2A in particular, similar to the upper portion 20 shown in FIG. 1, in the exemplary stovepipe shaped upper portion 130a, each of the intermediate convolutions of the upper portion have substantially the same diameter and the diameter of the uppermost convolution is less than the diameters of each of the intermediate convolutions of the upper portion. More specifically, the exemplary upper portion 130a includes three intermediate convolutions 131a, 132a, 133a in addition to the uppermost convolution 114a. The diameter of the three intermediate convolutions 131a, 132a, 133a are all substantially equal, and therefore the diameter of the these active convolutions is the upper minimum diameter of the exemplary upper portion 130a. Once again, although uppermost convolution 114a has a diameter that is less than the diameter of the three intermediate convolutions 131a, 132a, 133a because the uppermost convolution 114a is not an active convolution, its diameter does not affect the response of upper portion 130a. As such, the diameter of the uppermost convolution 114a is not limited and can be modified without departing from the spirit and scope of the present invention.

Referring now to FIG. 2B in particular, in the exemplary hourglass shaped upper portion 130b, the diameter of the intermediate convolution of the upper portion adjacent to the lower portion is greater than the upper minimum diameter, the diameter of another intermediate convolution of the upper portion is greater than the upper minimum diameter, and the diameter of at least one intermediate convolution positioned there between is equal to the upper minimum diameter. More specifically, the exemplary upper portion 130b includes four intermediate convolutions 131b, 132b, 133b, 134b in addition to the uppermost convolution 114b. The diameter of the first intermediate convolution 131b (i.e., the intermediate convolution of the upper portion 130b that would be adjacent to the unillustrated lower portion) is greater than the diameter of the second intermediate convolution 132b. The diameter of the second intermediate convolution 132b is likewise greater than the diameter of the third intermediate convolution 133b. The diameter of the fourth intermediate convolution 134b, however, is greater than the diameter of the third intermediate convolution 133b. As such, the diameter of the third intermediate convolution 133b is the upper minimum diameter. The smallest third intermediate convolution 133b is positioned between two larger intermediate convolutions (e.g., the first intermediate convolution 131b and the fourth intermediate convolution 134b) such that the upper portion 130b has an hourglass shape. Of note, the diameter of the uppermost convolution 114b is also substantially equal to the upper minimum diameter (e.g., the diameter of the third intermediate convolution 133b). However, because the uppermost convolution 114b is not an active convolution, its diameter does not affect the response of upper portion 130b, and as such the diameter of the uppermost convolution 114b is not limited and can be modified without departing from the spirit and scope of the present invention.

Referring now to FIG. 2C in particular, in the exemplary conical shaped upper portion 130c, the diameters of the convolutions of the intermediate convolutions of the upper portion gradually decrease from the lower portion towards the uppermost convolution. More specifically, the exemplary upper portion 130c includes three intermediate convolutions 131c, 132c, 133c in addition to the uppermost convolution 114c. The diameter of the first intermediate convolution 131c (i.e., the intermediate convolution of the upper portion 130c that would be adjacent to the unillustrated lower portion) is greater than the diameter of the second intermediate convolution 132c. The diameter of the second intermediate convolution 132c is likewise greater than the diameter of the third intermediate convolution 133c. Furthermore, the diameter of the third intermediate convolution 133c is greater than the diameter of the uppermost convolution 114c. However, because the uppermost convolution 114c is not an active convolution, its diameter does not affect the response of upper portion 130c, and as such the diameter of the uppermost convolution 114c is not limited and can be modified without departing from the spirit and scope of the present invention.

Referring now to FIG. 2D in particular, in the exemplary funnel shaped upper portion 130d, the diameters of the convolutions of the intermediate convolutions of the upper portion gradually increase from the lower portion towards the uppermost convolution. More specifically, the exemplary upper portion 130d includes three intermediate convolutions 131d, 132d, 133d in addition to the uppermost convolution 114d. The diameter of the first intermediate convolution 131d (i.e., the intermediate convolution of the upper portion 130d that would be adjacent to the unillustrated lower portion) is less than the diameter of the second intermediate convolution 132d. The diameter of the second intermediate convolution 132d is likewise less than the diameter of the third intermediate convolution 133d. Furthermore, the diameter of the third intermediate convolution 133d is less than the diameter of the uppermost convolution 114d. However, because the uppermost convolution 114d is not an active convolution, its diameter does not affect the response of upper portion 130d, and as such the diameter of the uppermost convolution 114d is not limited and can be modified without departing from the spirit and scope of the present invention.

Referring now to FIG. 2E in particular, in the exemplary barrel shaped upper portion 130e, the diameter of the intermediate convolution of the upper portion adjacent to the lower portion and the diameter of the intermediate convolution of the upper portion adjacent to the uppermost convolution is the upper minimum diameter, and the diameter of at least one intermediate convolution positioned therebetween is greater than the upper minimum diameter. More specifically, the exemplary upper portion 130e includes four intermediate convolutions 131e, 132e, 133e, 134e in addition to the uppermost convolution 114e. The diameter of the first intermediate convolution 131e (i.e., the intermediate convolution of the upper portion 130e that would be adjacent to the unillustrated lower portion) is less than the diameter of the second intermediate convolution 132e. The diameter of the third intermediate convolution 133e is substantially the same as the diameter of the second intermediate convolution 132e. The diameter of the fourth intermediate convolution 134e, is then less than the diameter of the third intermediate convolution 133e. As such, the diameter of the first intermediate convolution 131e and the fourth intermediate convolution 134e is the upper minimum diameter. Two larger intermediate convolutions (e.g., the second intermediate convolution 132e and the third intermediate convolution 133e) are positioned between these smaller convolutions such that the upper portion 130e has a barrel shape. Of note, the diameter of the uppermost convolution 114e is illustrated as smaller than the upper minimum diameter. However, because the uppermost convolution 114e is not an active convolution, its diameter does not affect the response of upper portion 130e, and as such the diameter of the uppermost convolution 114e is not limited and can be modified without departing from the spirit and scope of the present invention Once again, regardless of the particular shape of the upper portion, it is contemplated that in certain exemplary coil springs made in accordance with the present invention, the upper minimum diameter will generally be equal to or greater than the diameter of the smaller central convolution of the lower portion or, in other words, the lower minimum diameter. As such, it is contemplated that, upon initial compression of the coil spring, the upper portion will compress more readily than the lower portion. Although in the exemplary embodiments described above the uppermost convolution is not an active convolution, it is also contemplated that in some embodiments, the uppermost convolution may also be an active, or partially active, convolution and thus the diameter of the uppermost convolution may be chosen to contribute to the overall response of the upper portion in accordance with the present invention.

In the exemplary embodiments shown in FIGS. 2A-2E, the diameter varies between the convolutions in order to provide a particular spring constant and resultant feel of the upper portion of the coil spring, but the pitch between each of the convolutions of the upper portion is substantially the same. However, it is contemplated that to provide a particular spring constant and resultant feel, the pitch between the convolutions of the upper portion can vary instead of, or in addition to, varying the diameter of one or more convolutions in the upper portion. As previously mentioned, however, in at least some exemplary embodiments, the upper maximum pitch is less than the lower minimum pitch. That is to say, regardless of any variability in the pitches of the upper portion and/or the lower portion, the pitch between each of the convolutions of the upper portion is less than the pitch between each of the convolutions of the lower portion. As such, it is contemplated that, upon initial compression of the coil spring, the upper portion will compress more readily than the lower portion.

As a further refinement to the exemplary coil springs of the present invention, in some embodiments, the diameter of each of the active convolutions of the upper portion need not necessarily be greater than or equal to the diameter of the smaller central convolution of a lower portion of a spring in order to provide a variable and non-linear loading response. Rather, and referring now to FIG. 3A, in another embodiment, an exemplary coil spring 110a is provided where the upper minimum diameter is less than or equal to the lower minimum diameter and where the coil spring 110a also makes use of one of the alternative upper portions described above. In particular, in the coil spring 110a, the coil spring 110a is divided into a lower portion 120 and an upper portion 130a, with the lower portion 120 having an hour glass shape and including a lowermost convolution 112, a first intermediate convolution 124, a second intermediate convolution 126, and a third intermediate convolution 128. The second intermediate convolution 126, similar to the intermediate convolution 26 shown in FIG. 1 is also characterized as the central convolution of the lower portion 120 and has a diameter that is equal to the lower minimum diameter of the coil spring 110a. The upper portion 130a of the coil spring 110a is then similar to the stovepipe configuration shown in FIG. 2A and includes a fourth intermediate convolution 131a, a fifth intermediate convolution 132a, a sixth intermediate convolution 133a, and an uppermost convolution 114a. As such, the lower portion 120 of the exemplary coil spring 110a includes a total of four convolutions and the upper portion 130a of the exemplary coil spring 110a also includes a total of four convolutions.

Figure 3A:
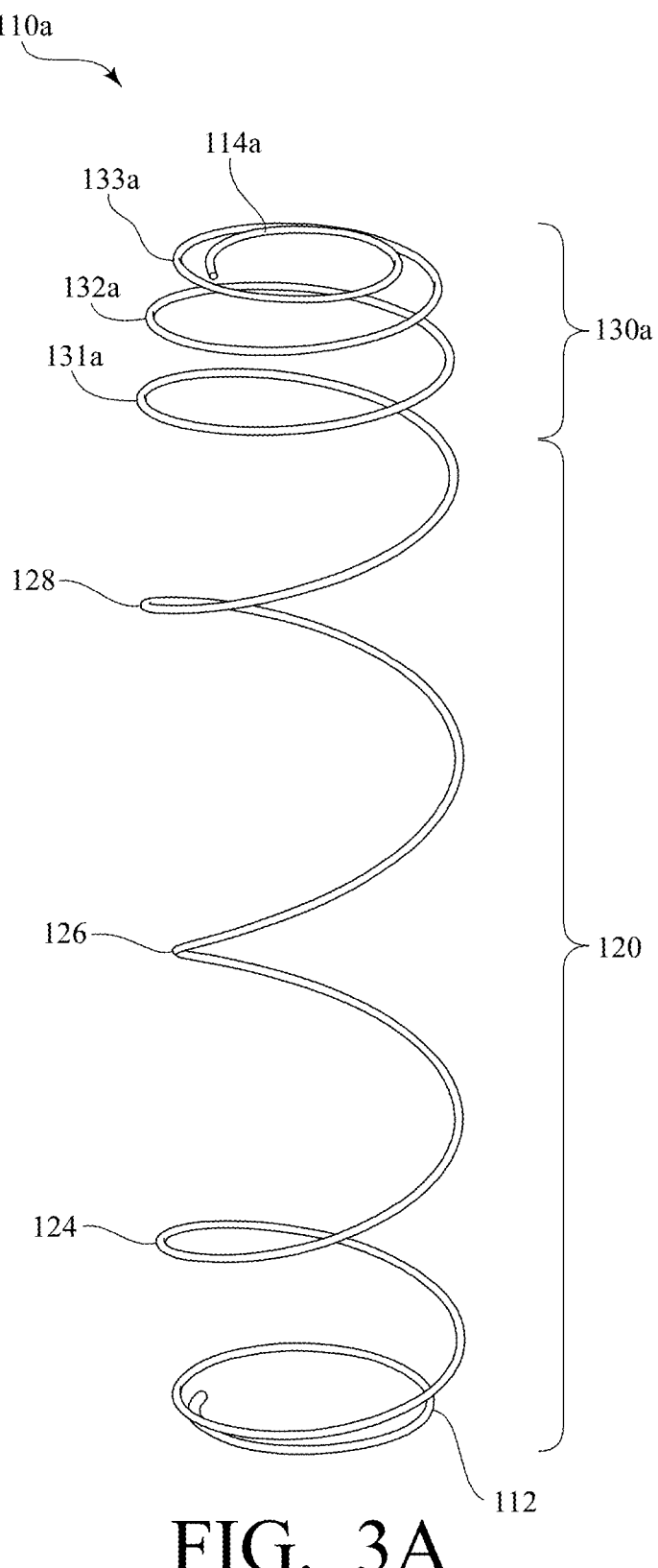
FIG. 3A is perspective view of another coil spring made in accordance with the present invention, and including an upper portion similar to that depicted in FIG. 2A.

As shown in FIG. 3A, in the exemplary coil spring 110a, each of the active convolutions of the lower portion 120 (i.e., the lower three intermediate convolutions 124, 126, 128) have a diameter greater than or equal to the lower minimum diameter, which, again, is the diameter of the second intermediate convolution 126. The pitch between each of the convolutions 112, 124, 126, 128 of the lower portion 20 is then greater than or equal to a lower minimum pitch. Furthermore, each of the active convolutions of the upper portion 130a (i.e., the upper three intermediate convolutions 131a, 132a, 133a) have a diameter less than or equal to an upper maximum diameter, and the pitch between each of the convolutions 131a, 132a, 133a, 114a of the upper portion 130 is less than or equal to an upper maximum pitch. In the exemplary coil spring 110a, however and unlike the coil spring 10 shown in FIG. 1, the upper minimum diameter is less than or equal to the lower minimum diameter as the diameters of the fifth intermediate convolution 132a and the sixth intermediate convolution 133a are smaller than that of the second intermediate convolution 126. In the coil spring 110a, the pitch between each of the active convolutions of the upper portion 130a then remains less than or equal to the pitch between each of the active convolutions of the lower portion 120, such that the coil spring 110a retains and exhibits a variable and non-linear loading response.

Figure 3B:
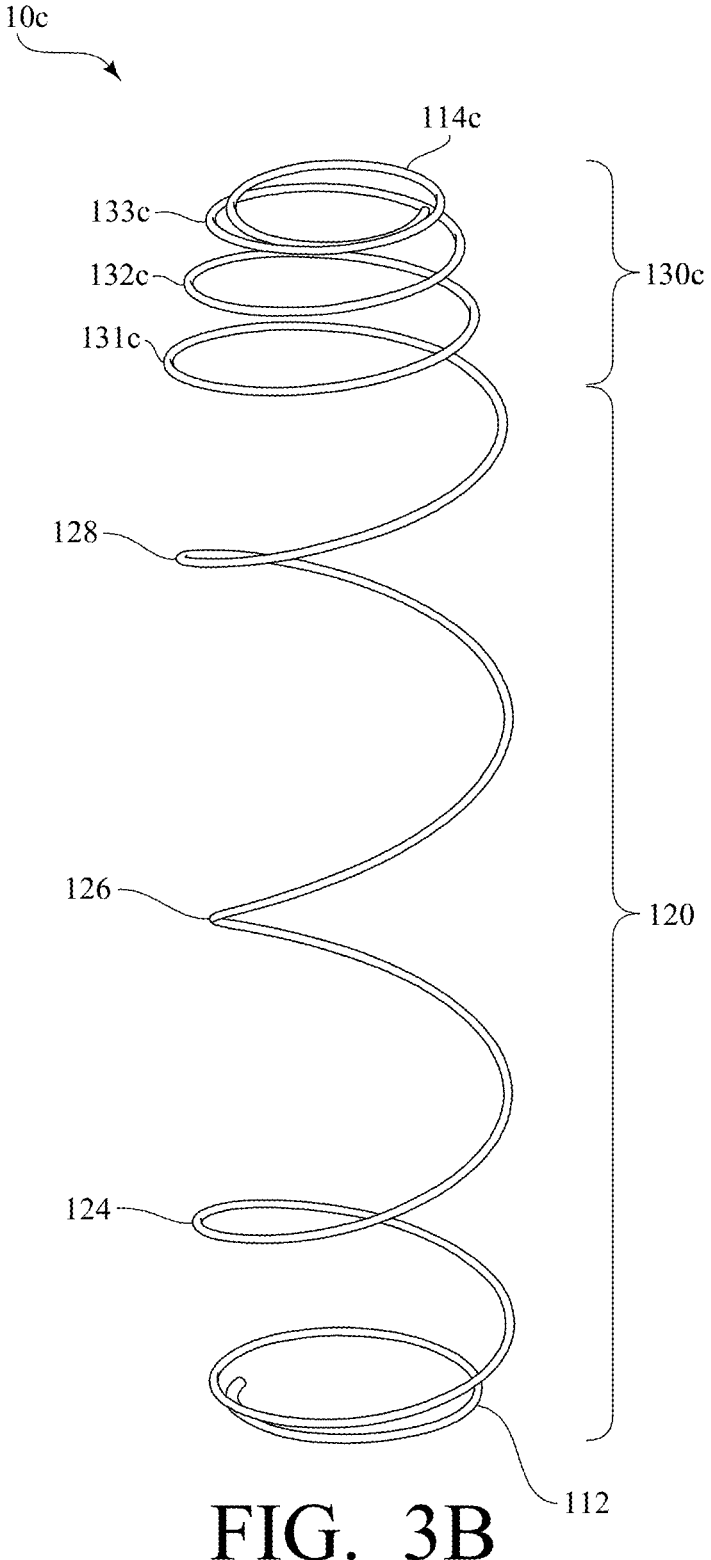
FIG. 3B is perspective view of another coil spring made in accordance with the present invention, and including an upper portion similar to that depicted in FIG. 2C.

As an even further refinement and example of a coil spring made in accordance with the present invention, and referring now to FIG. 3B, a coil spring 110c is provided that, also similar to the coil spring 110a shown in FIG. 3A, has a lower portion 120 and an upper portion 130c. The lower portion 120 is substantially the same as that shown in FIG. 3A, with the lower portion 120 including a lowermost convolution 112, a first intermediate convolution 124, a second intermediate convolution 126, and a third intermediate convolution 128 having pitches and diameters the same as that described above with respect to FIG. 3A. Unlike the coil spring 110a shown in FIG. 3A, however, the upper portion 130c of the coil spring 110c is similar to the conical configuration shown in FIG. 2C and includes a fourth intermediate convolution 131c, a fifth intermediate convolution 132c, a sixth intermediate convolution 133c, and an uppermost convolution 114c, with the fourth intermediate convolution 131c having a diameter greater than the fifth intermediate convolution 132c, and with the fifth intermediate convolution 132c having a diameter greater than the sixth intermediate convolution 133c. In this regard, in the coil spring 110c, the upper minimum diameter is similarly less than or equal to the lower minimum diameter as the diameters of the fifth intermediate convolution 132c and sixth intermediate convolution 133c are smaller than that of the second intermediate convolution 126. In the coil spring 110c, the pitch between each of the active convolutions of the upper portion 130a then likewise remains less than or equal to the pitch between each of the active convolutions of the lower portion 120, such that the coil spring 110c also retains a variable and non-linear loading response.

With further regard to embodiments of the exemplary coil springs described herein in which the upper minimum diameter is less than or equal to the lower minimum diameter, it is of course contemplated that such embodiments are not limited to the stovepipe and conical configurations of the upper portions shown in FIGS. 3A-3B, but that such embodiments can also be extended to other configurations of an upper portion of an exemplary spring. For instance, in further embodiments having an upper minimum diameter less than or equal to a lower minimum diameter, it is contemplated that the upper portion from FIG. 2B could be utilized where convolution 133b would be the smallest diameter of an exemplary coil spring, that the upper portion from FIG. 2D could be utilized where convolution 131b would be the smallest diameter of an exemplary coil spring, or that the upper portion from FIG. 2E could be utilized where convolutions 131e and 134e would be the smallest diameter of an exemplary coil spring.

Figure 4:
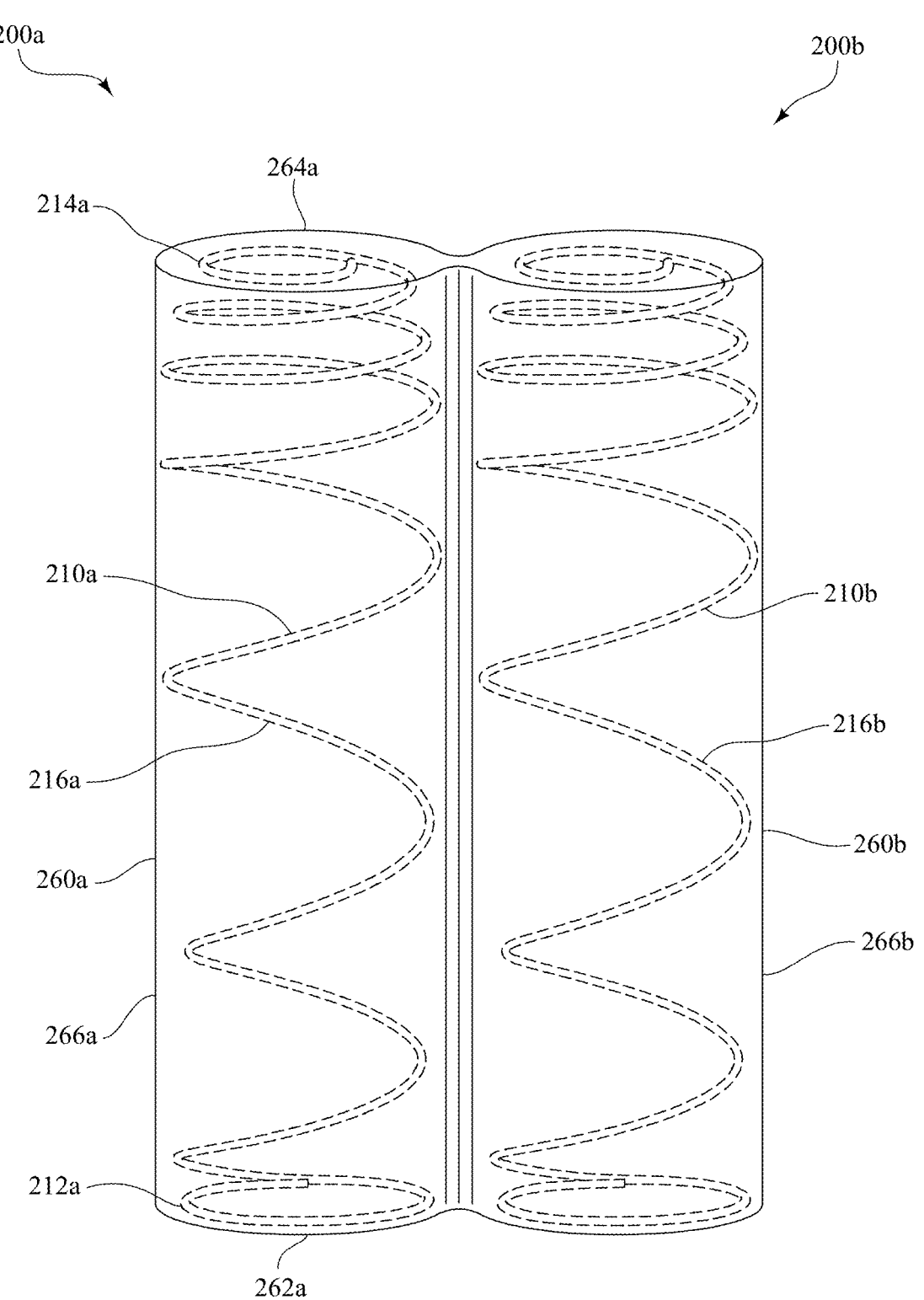
FIG. 4 is a perspective view of two pocketed coil springs made in accordance with the present invention in which the two coil springs are in the same orientation.

Referring now to FIG. 4, in another exemplary embodiment of the present invention, a first pocketed coil spring 200a is provided that includes a coil spring 210a substantially similar to the coil spring 10 described above with respect to FIG. 1. However, the first pocketed coil spring 200a further includes a flexible enclosure 260a that forms a pocket around the coil spring 210a. The flexible enclosure 260a includes a bottom wall 262a positioned adjacent to the lowermost convolution 212a of the coil spring 210a, a top wall 264a positioned adjacent to the uppermost convolution 214a of the coil spring 210a, and a continuous side wall 266a that extends from the bottom wall 262a to the top wall 264a, such that the continuous side wall 266a surrounds the coil spring 210a.

As shown in FIG. 4, a second pocketed coil spring 200b is also provided adjacent to the first pocketed coil spring 200a. The second pocketed coil spring 200b is substantially identical to the first pocketed coil spring 200a including both the coil spring 210b and the flexible enclosure 260b that forms a pocket around the coil spring 210b. As shown in FIG. 4, the first pocketed coil spring 200a and the second pocketed coil spring 200b are connected along their respective sidewalls 266a, 266b. The methods of connecting adjacent pocketed coil springs is not limited and may including gluing or otherwise adjoining pocketed coil springs that are individually manufactured or alternatively manufacturing the adjacent pocketed coil springs substantially simultaneously so as to already be connected. For example, a flexible fabric may be provided and the flexible enclosures 260a, 260b are formed from the flexible fabric so as to surround each of the individual coil springs 210a, 210b to result in the first and second adjacent pocketed coil springs 200a, 200b shown in FIG. 4. To this end, the flexible fabric is preferably made of a non-woven fabric which can be joined or welded together by heat and pressure (e.g., via ultrasonic welding or similar thermal welding procedure). For example, suitable fabrics may include one of various thermoplastic fibers known in the art, such as non-woven polymer-based fabric, non-woven polypropylene material, or non-woven polyester material. In this regard, in some embodiments, suitable non-woven fabrics can be comprised of an elastic material, such as an elastane (i.e., spandex), that is capable of recovering to its original shape upon stretching. In short, a wide variety of fabrics or similar material can thus be used to make a flexible enclosure in accordance with the present invention and, of course, such non-woven fabrics can be joined together by stitching, metal staples, welding, or other suitable methods. As such, adjacent pocketed coil springs are connected to each other, for example, by welding or gluing. Such interconnection, however, can alternatively be carried out by means of clamps or hook-and-loop fasteners, or in some other convenient manner.

Referring still to FIG. 4, in this exemplary embodiment, the coil spring 210a of the first pocketed coil spring 200a is in a first orientation with respect to rotation about a longitudinal axis of the coil spring 210a. The coil spring 210b of the second pocketed coil spring 200b is also in the first orientation. As such, the continuous wires 216a, 216b follow substantially parallel helical paths. In other words, a distance between the continuous wires 216a, 216b is substantially equal at any given height of the coil springs 210a, 210b. However, one possible issue with this arrangement (i.e., where two adjacent coil springs are both in the first orientation) is that the coil springs are more likely to nest into each other.

Figure 5:
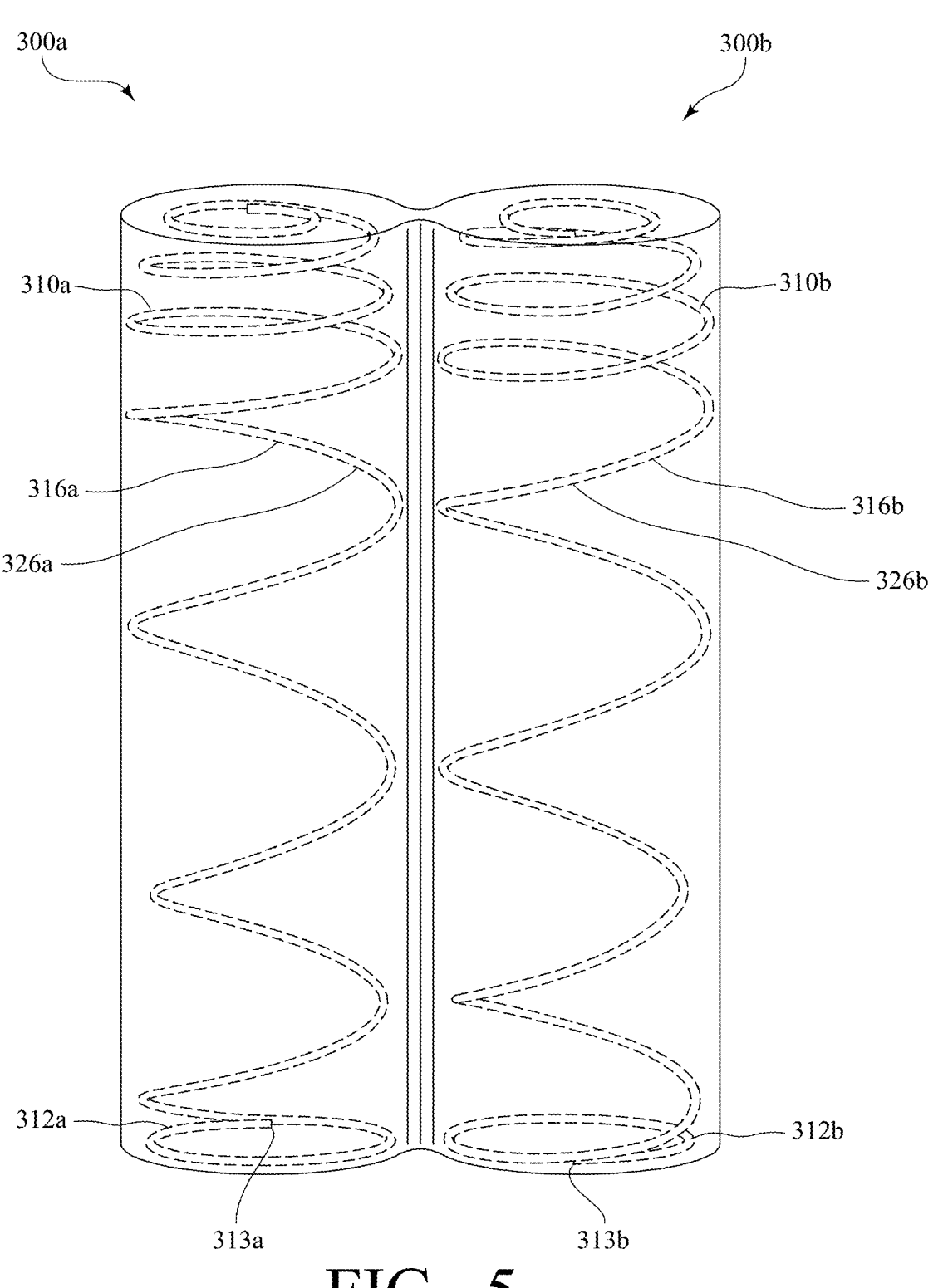
FIG. 5 is a perspective view of two pocketed coil springs made in accordance with the present invention in which the two coil springs are in different orientations.

By comparison, and referring now to FIG. 5, in another exemplary embodiment, the coil spring 310*a* of the first pocketed coil spring 300*a* is in a first orientation, but the coil spring 310*b* of the second pocketed coil spring 300*b* is in a second orientation rotated 180° about the longitudinal axis of the coil spring 310*b* relative to the first orientation. For example, in FIG. 5, the terminal end 313*a* of the lowermost convolution 312*a* of the first pocketed coil spring 300*a* is located towards the back of the first pocketed coil spring 300*a* of FIG. 5 while the terminal end 313*b* of the lowermost convolution 312*b* of the second pocketed coil spring 300*b* is located towards the front of the pocketed coil spring 300*b* in FIG. 5. More importantly, due to the 180° rotation, the continuous wires 316*a*, 316*b* no longer follow parallel helical paths and as such, a distance between the continuous wires 316*a*, 316*b* varies along the height of the coil springs 310*a*, 310*b*. Accordingly, the coil springs are no longer able to nest into each other. For example, in FIG. 5, a rightmost portion of the third convolution 326*a* of the first pocketed coil spring 300*a* is immediately adjacent to a leftmost portion of the third convolution 326*b* of the second pocketed coil spring 300*b*. The proximity of these portions of the adjacent springs would therefore reduce, or prevent altogether, any tendency for the two adjacent coils springs to nest into each other.

Figure 6A:
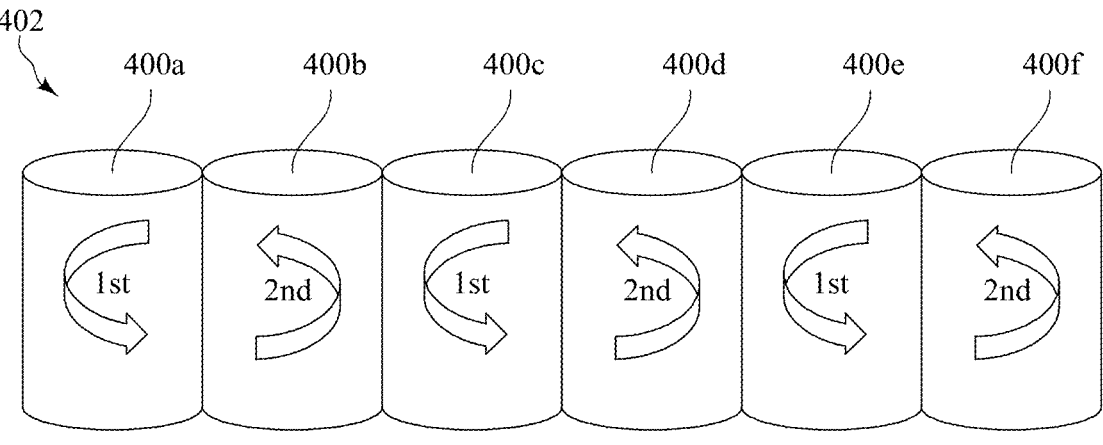
FIG. 6A is a side schematic view of a strand of pocketed coil springs in which the coil springs alternate between a first orientation and a second orientation.

Referring now to FIG. 6A, in some exemplary embodiments of the present invention, a plurality of adjacent pocketed coil springs 400*a*-400*f* are connected in a line to form a strand 402 of pocketed coil springs in which the pocketed coil springs 400*a*-400*f* are aligned along a length of the strand 402. In the exemplary strand 402 shown in FIG. 6A, adjacent pocketed coil springs 400*a*-400*f* within the strand 402 have coil springs which alternate between the first orientation and the second orientation discussed above with respect to FIG. 5. For example, the first pocketed coil spring 400*a* has a coil spring in the first orientation, the second pocketed coil spring 400*b* has a coil spring in the second orientation, the third pocketed coil spring 400*c* has a coil spring in the first orientation, the fourth pocketed coil spring 400*d* has a coil spring in the second orientation, the fifth pocketed coil spring 400*e* has a coil spring in the first orientation, and the sixth pocketed coil spring 400*f* has a coil spring in the second orientation. As such, within the same strand 402 of pocketed coil springs, for each of the coil springs in the first orientation (i.e., the first, third, and fifth pocketed coil springs 400*a*, 400*c*, 400*e*) an adjacent coil spring is in the second orientation (i.e., the second, fourth, and sixth pocketed coil springs 400*b*, 400*d*, 400*f*). Of course, it is not necessary that the orientation of the coil springs alternate with each adjacent spring. Other configurations such as 3-3, 2-2-2, or 1-2-1-2 are also possible depending on the particular form and function desired of the strand of pocketed coil springs.

Figure 6B:
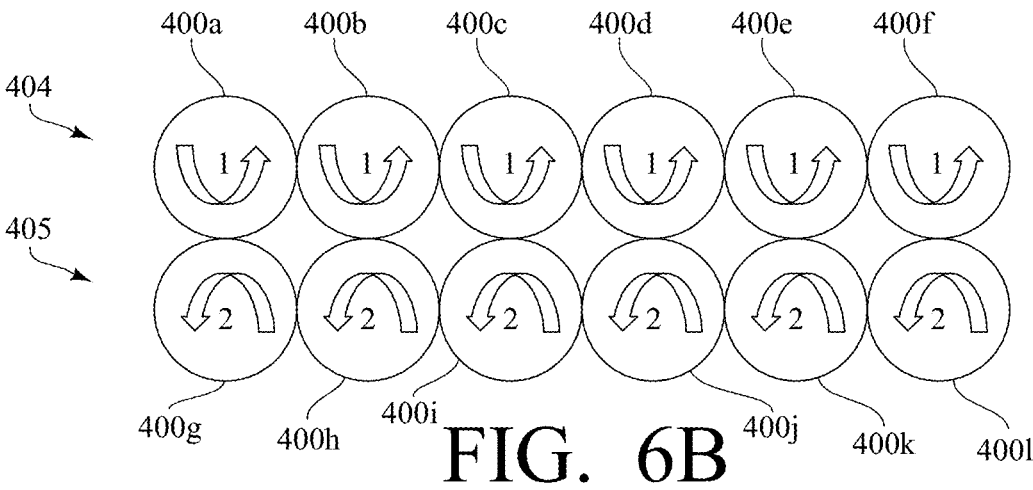
FIG. 6B is a top schematic view of two strands of pocketed coil springs in which the coil springs in a first strand are in a first orientation and the coil springs in a second strand are in a second orientation.

Furthermore, and referring now to FIG. 6B, in some other exemplary embodiments of the present invention, two adjacent strands 404, 405 of pocketed coil springs are provided. In the first strand 404, all of the pocketed coils springs 400*a*-400*f* have coil springs in the first orientation. In the second strand 405, all of the pocketed coil springs 400*g*-400*l* have coil springs in the second orientation. As shown, for each of the pocketed coil springs 400*a*-400*f* of the first strand 404, there is an adjacent pocketed coil spring 400*g*-400*l* of the second strand 405. In other words, for each of the plurality of coil springs in the first orientation in the first strand 404, there is an adjacent coil spring in the second orientation located in the adjacent second strand 405. As previously stated, the plurality of pocketed coil springs 400*a*-400*f* in the first strand 404 have coil springs in the first orientation and the plurality of pocketed coil springs 400*g*-400*l* in the second strand 405 have coil springs in the second orientation. However, it is not necessary that each and every coil spring within a strand is in the same orientation. Rather, one or more coil springs within each strand may be in an alternate orientation without departing from the spirit and scope of the present invention.

Figure 6C:
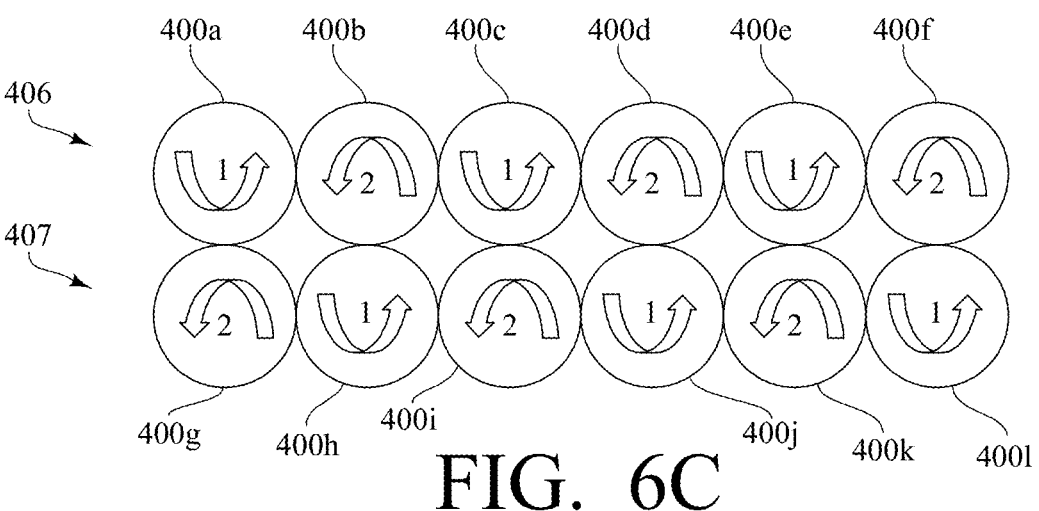
FIG. 6C is a top schematic view of two strands of pocketed coil springs in which the coil springs in a first strand alternate between a first orientation and a second orientation and the coil springs in a second strand also alternate between the first orientation and the second orientation.

Referring now to FIG. 6C, in yet another exemplary embodiment of the present invention, two adjacent strands 406, 407 of pocketed coil springs are once again provided. However, in this exemplary embodiment, and similar to the strand 402 described above with respect to FIG. 6A, adjacent pocketed coil springs 400*a*-400*f* within the first strand 406 have coil springs that alternate between the first orientation and the second orientation and similarly adjacent pocketed coil springs 400*g*-400*l* within the second strand 407 have coil springs that alternate between the first orientation and the second orientation. As such, within the first strand 406 of pocketed coil springs, for each of the coil springs in the first orientation (i.e., the first, third, and fifth pocketed coil springs 400*a*, 400*c*, 400*e*) an adjacent coil spring is in the second orientation (i.e., the second, fourth, and sixth pocketed coil springs 400*b*, 400*d*, 400*f*). But additionally, there is another adjacent coil spring in the second orientation in the second strand 407 (i.e., the first, third, and fifth pocketed coil springs 400*g*, 400*i*, 400*k*).

Figure 7:
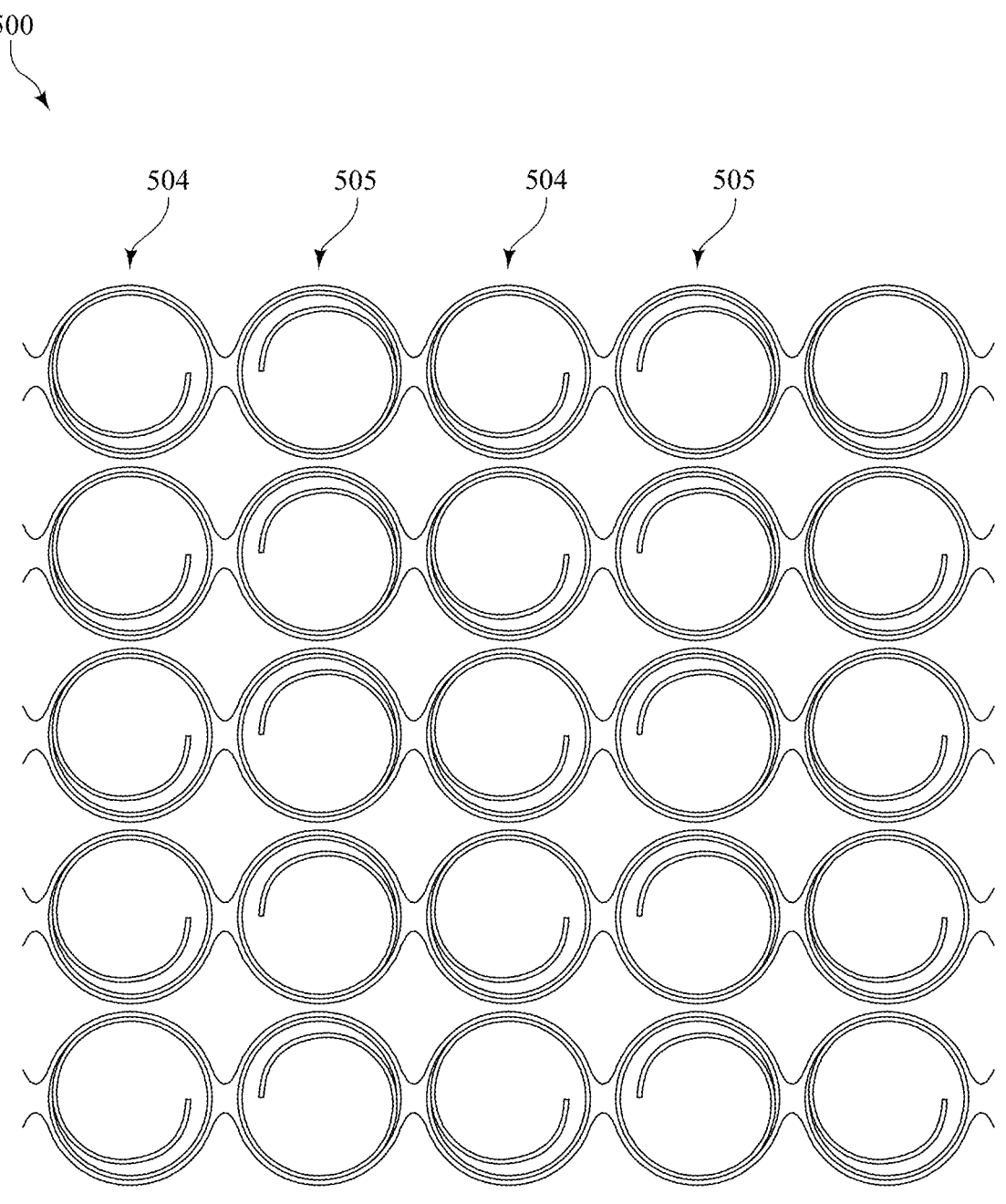
FIG. 7 is a top view of one exemplary mattress assembly in which the coil springs in a first set of strands are in a first orientation and the coil springs in a second set of strands are in a second orientation.

Of note, a plurality of strands of pocketed coil springs provided in parallel, such as those illustrated in FIGS. 6B and 6C, can form a mattress assembly. Referring now to FIG. 7, one exemplary mattress assembly 500 includes a plurality of strands 504, 505 of coil springs in which the coil springs are oriented similar to FIG. 6B. That is to say, in a first set of strands 504, all of the pocketed coils springs have coil springs in a first orientation. In a second set of strands 505 that alternate with the first set of strands 504, all of the pocketed coil springs have coil springs in a second orientation. As shown, for each of the pocketed coil springs of the first strand 504 in the first orientation, there is an adjacent pocketed coil spring of an adjacent second strand 505 in the second orientation.

Figure 8:
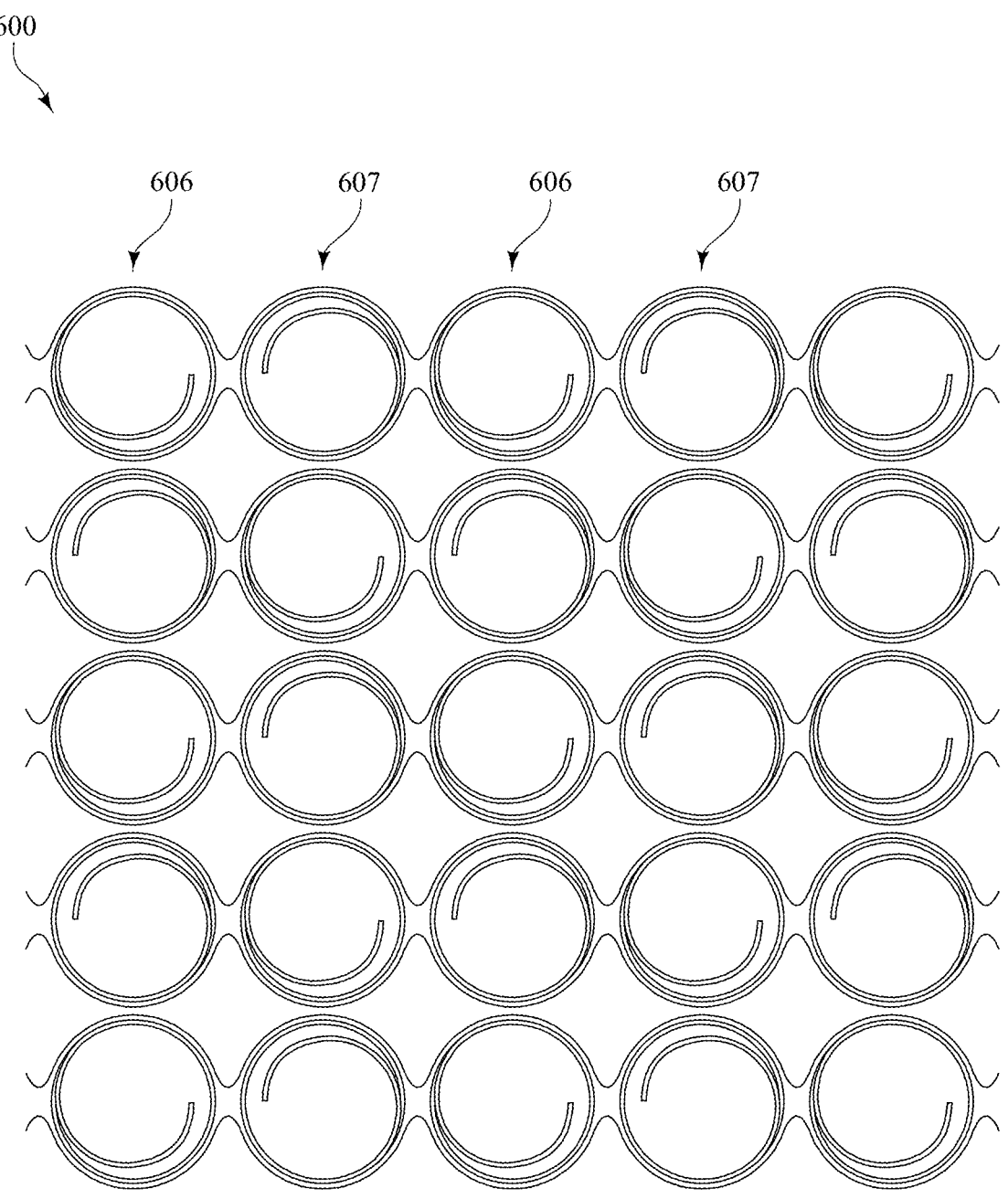
FIG. 8 is a top view of one exemplary mattress assembly in which the coil springs in a first set of strands alternate between a first orientation and a second orientation and the coil springs in a second set of strands also alternate between the first orientation and the second orientation.

Referring now to FIG. 8, another exemplary mattress assembly 600 includes a plurality of strands 606, 607 of coil springs in which the coil springs are oriented similar to FIG. 6C. That is to say, within each of the strands 606, 607, the pocketed coil springs alternate between the first orientation and the second orientation. As such, within the first set of strands 606 of pocketed coil springs, for each of the coil springs in the first orientation an adjacent coil spring is in the second orientation. But additionally, there is another adjacent coil spring in the second orientation in an adjacent second strand 607. This can be referred to as a checkerboard pattern.

As a further refinement, a mattress assembly made in accordance with the present invention can include coil springs in different patterns of first and second orientations in different zones, or areas, of the mattress assembly. To provide a non-limiting list of examples, a mattress assembly may include a perimeter and non-perimeter zone; a head and foot zone; a left and right zone; or any combination thereof. Each of these zones may have a different pattern of oriented coils depending on the desired function and feel of the zone. For example, coils which are all in the same orientation may provide one desired feel upon compression while coils which alternate orientations may provide a different desired feel. Furthermore, in some embodiments, the pattern may gradually vary between different zones in order to provide a smoother transition between the different zones. For example, a first zone may have all of the coil springs in a first orientation and the second zone may have a checkerboard alternation between the first orientation and the second orientation (e.g., the pattern shown in FIG. 6C and FIG. 8) but in a transitional area between the first zone and the second zone, there may be some coils which have adjacent coils in the same orientation and other coils which have adjacent coils in the alternate orientation.

However, while a 180° rotation is shown in the Figures and discussed above, different amounts of rotation, such as 30°, 60°, 90°, 120°, and 150° are also possible without departing from the spirit and scope of the present invention. Different amounts of rotation can likewise be used within different zones and/or to transition between zones.

As a further refinement to the present invention, the coil springs within the pocketed coil springs are prevented from changing their orientation after assembly. In some embodiments, the fabric used to form the pocket is sufficient by itself to prevent rotation of the coil spring about the longitudinal axis of the coil spring. In some other embodiments, an additional means is provided to prevent rotation of the coil spring about the longitudinal axis of the coil spring. For example, in some embodiments, the cut ends of the wire (e.g., the start/end of the coil spring) may be positioned outside of the final convolutions to provide pushback against the fabric. In other embodiments, the coil spring may be preloaded (e.g., partially compressed) prior to forming the pocket such that the coil spring provides sufficient force on the top and bottom to prevent rotation. In still other embodiments, the pocket may be welded shut on the top and/or bottom of the coil in such a manner that the weld itself prevents rotation, including but not limited to using shaped welding heads specifically designed to create welds that engage with the coil spring and prevent rotation. Further still, in some embodiments, a mechanical connection, such as glue, fasteners, bands, threads, etc. can be used to physically connect the coil spring to the pocket in a manner as to prevent rotation.

According to some exemplary implementations of the present invention, a mattress assembly is manufactured by first providing a plurality of coil springs, such as one of the exemplary coil springs described above with respect to FIGS. 1-5. A pocket is then formed around each of the coil springs with a flexible enclosure such that each pocketed coil spring is in a strand of pocketed coil springs, such as one of the strands described above with respect to FIGS. 6A-6C. A plurality of strands of pocketed coils are the positioned in parallel resulting in a mattress assembly, such as one of the mattress assemblies described above with respect to FIGS. 7-8. According to some exemplary implementations of the present invention, prior to forming the pocket around each coil spring, the coil spring is positioned in either the first orientation or the second orientation, as discussed above with respect to FIGS. 6A-6C and 7-8.

Figure 9:
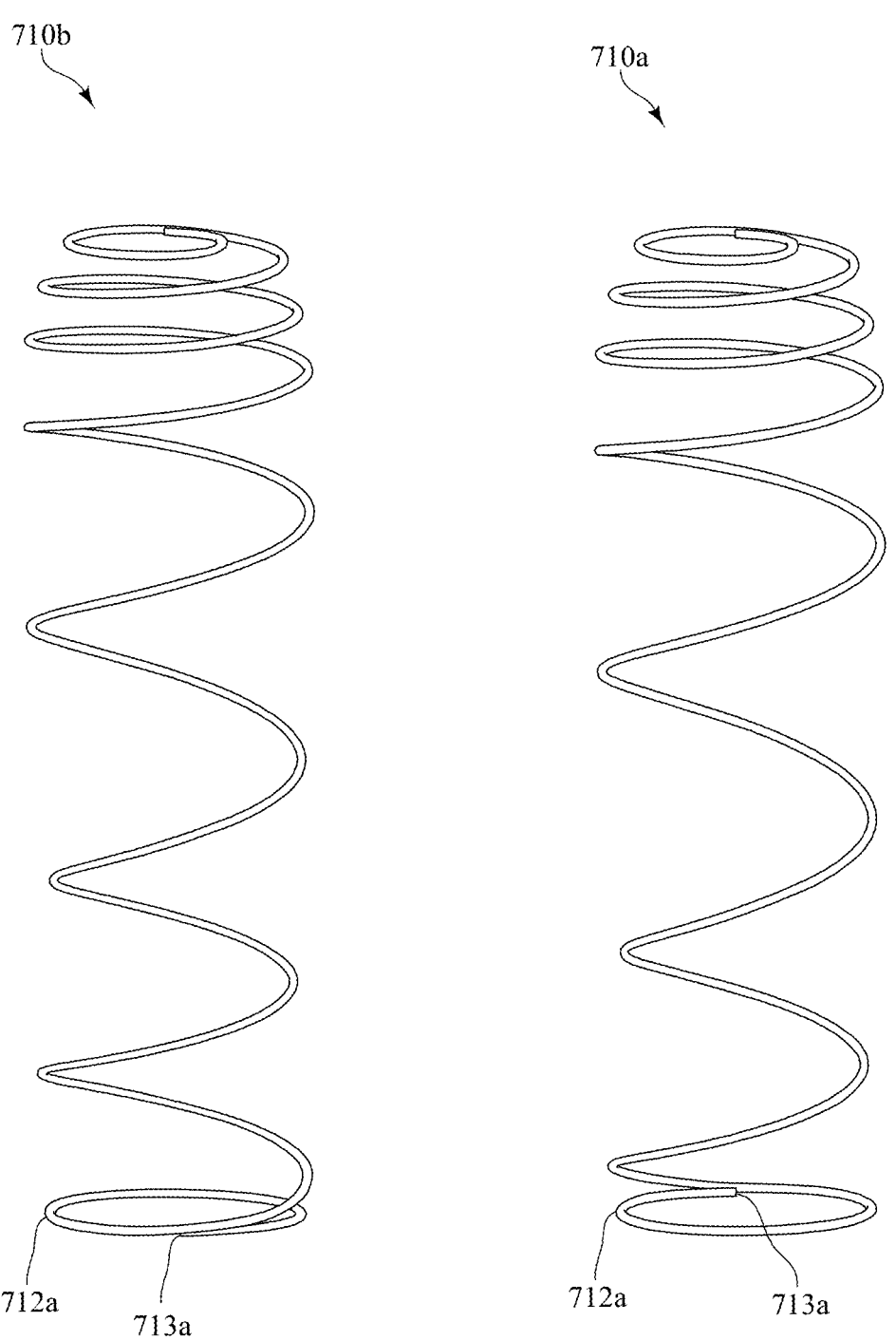
FIG. 9 is a perspective view of two coil springs in which an amount of wire included in the lowermost convolution differs.
Figure 10:
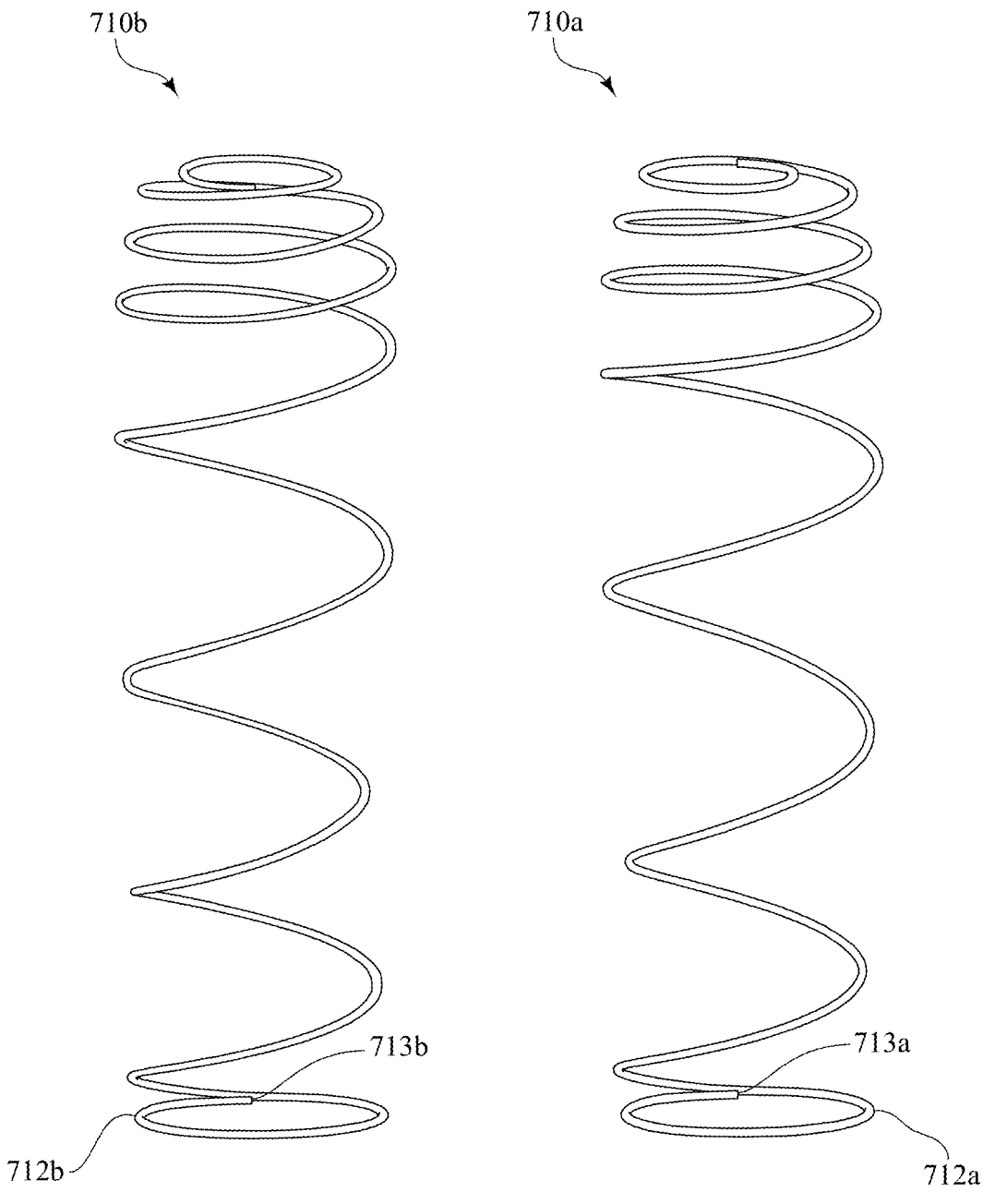
FIG. 10 is a perspective view of the two coil springs of FIG. 9 with the terminal ends of the coil springs aligned.

In some exemplary implementations, a coiler is used to produce the coils springs and the orientation of the spring is determined by an amount of wire included in the lowermost convolution of the coil spring. Referring now specifically to FIGS. 9 and 10, according to one exemplary implementation, a first coil 710*a* (representative of coils intended to be in the first orientation) is manufactured and provided by the coiler so as to be substantially the same as the coils described above with respect to FIGS. 1 and 4-5. A second coil 710*b* (representative of coils intended to be in the second orientation) is manufactured substantially the same except it includes an additional half turn of wire in the lowermost convolution 712*b* of the coil spring 710*b*. As such, and as illustrated in FIG. 10, when the terminal ends 713*a*, 713*b* of the coil springs 710*a*, 710*b* are aligned, the second coil 710*b* with the additional half turn has been rotated 180° relative to the first coil 710*a*. Although not expressly shown, when a pocket is formed around the first and second coils 710*a*, 710*b*, the terminal ends 713*a*, 713*b* would be in substantially the same place relative to the pocket around the coil springs 710*a*, 710*b*.

Rather than including an additional half turn of wire, it is contemplated that the amount of wire included in the lowermost convolution can instead be reduced by a half turn to result in a similar change of orientation. Likewise, the addition or subtraction of wire can occur at the uppermost convolution to result in a similar change of orientation. Of course, in all instances, the change in the amount of wire need not be a half turn but could be less than a half turn or more than a half turn without departing from the spirit and scope of the present invention.

In embodiments where the coil springs are manufactured and produced by a coiler with different amount of coil in the lowermost and/or uppermost convolution, it is contemplated that, because the cut point position on the coiler remains the same, the amount of wire included in the lowermost and/or uppermost convolution of the coil spring determines the orientation of the spring.

Of course, identical coil springs can also be oriented using any number of secondary mechanical devices, such as a turning mechanism after the coils have been provided but before they are pocketed.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

What is claimed is:

1. A pocketed coil spring, comprising:
   a coil spring including
      a continuous wire forming a lowermost convolution, an uppermost convolution opposite the lowermost convolution, and a plurality of helical intermediate convolutions between the lowermost convolution and the uppermost convolution, the continuous wire defining a pitch between the lowermost convolution, the helical convolution adjacent to the lowermost convolution, a pitch between each one of the plurality of intermediate convolutions, and a pitch between the uppermost convolution and the intermediate convolution adjacent to the uppermost convolution, and the continuous wire divided into
         a lower portion including the lowermost convolution and one or more of the intermediate convolutions, each of the one or more intermediate convolutions of the lower portion having a diameter greater than or equal to a lower minimum diameter, the pitch between each of the convolutions of the lower portion greater than or equal to a lower minimum pitch, the diameter of a single central convolution of the one or more intermediate convolutions of the lower portion equal to the lower minimum diameter, the diameter of each of the other convolutions of the one or more intermediate convolutions of the lower portion being the same as one another, and the diameter of each of the other convolutions of the one or more intermediate convolutions of the lower portion being greater than the lower minimum diameter such that the lower portion has an hourglass shape, and an upper portion including the uppermost convolution and one or more of the intermediate convolutions, each of the one or more intermediate convolutions of the upper portion having a diameter greater than or equal to an upper minimum diameter, the pitch between each of the convolutions of the upper portion less than or equal to an upper maximum pitch, the diameters of the one or more intermediate convolutions of the upper portion gradually decreasing from the lower portion towards the uppermost convolution such that the upper portion has a conical shape; and a flexible enclosure forming a pocket around the coil spring, wherein the upper minimum diameter is greater than or equal to the lower minimum diameter and the upper maximum pitch is less than the lower minimum pitch.

2. A method of manufacturing a mattress assembly, comprising:

providing a plurality of coil springs, each coil spring including a continuous wire forming a lowermost convolution, an uppermost convolution opposite the lowermost convolution, and a plurality of helical intermediate convolutions between the lowermost convolution and the uppermost convolution, the continuous wire defining a pitch between the lowermost convolution and the helical convolution adjacent to the lowermost convolution, a pitch between each one of the plurality of intermediate convolutions, and a pitch between the uppermost convolution and the intermediate convolution adjacent to the uppermost convolution, and the continuous wire divided into a lower portion including the lowermost convolution and one or more of the intermediate convolutions, each of the one or more intermediate convolutions of the lower portion having a diameter greater than or equal to a lower minimum diameter, the pitch between each of the convolutions of the lower portion greater than or equal to a lower minimum pitch, and an upper portion including the uppermost convolution and one or more of the intermediate convolutions, each of the one or more intermediate convolutions of the upper portion having a diameter greater than or equal to an upper minimum diameter, the pitch between each of the convolutions of the upper portion less than or equal to an upper maximum pitch;

forming a pocket around each coil spring with a flexible enclosure such that each pocketed coil spring is in a strand of pocketed coil springs; and positioning a plurality of the strands of pocketed coil springs in parallel, wherein the upper maximum pitch is less than the lower minimum pitch, wherein, prior to forming the pocket around each coil spring, the coil spring is positioned in either a first orientation or a second orientation rotated 180° about a longitudinal axis of the coil spring relative to the first orientation, and wherein the upper minimum diameter is less than or equal to the lower minimum diameter.

3. The method of claim 2, wherein the plurality of coil springs are provided from a coiler and the orientation of the spring is determined by an amount of wire included in the lowermost convolution of the coil spring.

4. The method of claim 2, wherein the coil springs that are in the second orientation are provided with an additional half turn of wire in the lowermost convolution of the coil spring such that a terminal end of the coil springs in the first orientation and a terminal end of the coil springs in the second orientation are in substantially the same place relative to the pocket around each coil spring.

5. The method of claim 2, wherein the plurality of coil springs are provided from a coiler and the orientation of the spring is determined by a turning mechanism after the coiler provides the spring and before the pocket is formed around the coil spring.

6. A coil spring, comprising:

a continuous wire forming a lowermost convolution, an uppermost convolution opposite the lowermost convolution, and a plurality of helical intermediate convolutions between the lowermost convolution and the uppermost convolution, the continuous wire defining a pitch between the lowermost convolution and the helical convolution adjacent to the lowermost convolution, a pitch between each one of the plurality of intermediate convolutions, and a pitch between the uppermost convolution and the intermediate convolution adjacent to the uppermost convolution, and the continuous wire divided into a lower portion including the lowermost convolution and one or more of the intermediate convolutions, each of the one or more intermediate convolutions of the lower portion having a diameter greater than or equal to a lower minimum diameter, and the pitch between each of the convolutions of the lower portion greater than or equal to a lower minimum pitch, and an upper portion including the uppermost convolution and one or more of the intermediate convolutions, each of the one or more intermediate convolutions of the upper portion having a diameter greater than or equal to an upper minimum diameter, the pitch between each of the convolutions of the upper portion less than or equal to an upper maximum pitch, wherein one of the helical intermediate convolutions of the lower portion forms a central convolution having a diameter equal to the lower minimum diameter, wherein the diameter of each of the other intermediate convolutions of the lower portion is the same and the diameter of each of the other intermediate convolutions of the lower portion is greater than the lower minimum diameter such that the lower portion has an hourglass shape, wherein the upper minimum diameter is less than or equal to the lower minimum diameter, and wherein the upper maximum pitch is less than the lower minimum pitch.

7. The coil spring of claim 6, wherein the lower portion includes a total of between three convolutions and eight convolutions.

8. The coil spring of claim 6, wherein the upper portion includes a total of between three convolutions and six convolutions.

9. The coil spring of claim 6, wherein a number of convolutions of the upper portion is less than or the same as a number of convolutions of the lower portion.

10. The coil spring of claim 6, wherein the diameters of each of the intermediate convolutions of the upper portion are substantially equal and the diameter of the uppermost convolution is less than the diameters of each of the intermediate convolutions of the upper portion such that the upper portion has a stovepipe shape.

11. The coil spring of claim 6, wherein the diameter of the intermediate convolution of the upper portion adjacent to the lower portion is greater than the upper minimum diameter, the diameter of another intermediate convolution of the upper portion is greater than the upper minimum diameter, and the diameter of at least one intermediate convolution positioned there between is equal to the upper minimum diameter such that the upper portion has an hourglass shape.

12. The coil spring of claim 11, wherein the diameter of the uppermost convolution is equal to the upper minimum diameter.

13. The coil spring of claim 6, wherein the diameters of the convolutions of the intermediate convolutions of the upper portion gradually decrease from the lower portion towards the uppermost convolution such that the upper portion has a conical shape.

14. The coil spring of claim 6, wherein the diameters of the convolutions of the intermediate convolutions of the upper portion gradually increase from the lower portion towards the uppermost convolution such that the upper portion has a funnel shape.

15. The coil spring of claim 6, wherein the diameter of the intermediate convolution of the upper portion adjacent to the lower portion and the diameter of the intermediate convolution of the upper portion adjacent to the uppermost convolution is the upper minimum diameter, and the diameter of at least one intermediate convolution positioned there between is greater than the upper minimum diameter such that the upper portion has a barrel shape.

16. A pocketed coil spring, comprising:
   a coil spring according to claim 6, and
   a flexible enclosure forming a pocket around the coil spring.

17. A mattress assembly, comprising a plurality of parallel strands of pocketed coil springs, each strand including
   a plurality of coil springs according to claim 6 aligned along a length of the strand, and
   a flexible enclosure forming a pocket around each of the coil springs of the strand,
   wherein the upper minimum diameter is less than or equal to the lower minimum diameter and the upper maximum pitch is less than the lower minimum pitch,
   wherein for each of the plurality of coil springs, each coil spring is in a first orientation and an adjacent coil spring is in a second orientation rotated 180° about a longitudinal axis of the coil springs relative to the first orientation.

* * * * *